US012585262B2

(12) United States Patent
Clark et al.

(10) Patent No.: US 12,585,262 B2
(45) Date of Patent: Mar. 24, 2026

(54) ENCODED HIERARCHY REPRESENTATION AND METHOD OF GENERATING SAME

(71) Applicant: SAP SE, Walldorf (DE)

(72) Inventors: Mitchell Clark, Alexandria, VA (US);
Aseem Amitav Panda, Boudh (IN)

(73) Assignee: SAP SE, Walldorf (DE)

( * ) Notice: Subject to any disclaimer, the term of this patent is extended or adjusted under 35 U.S.C. 154(b) by 850 days.

(21) Appl. No.: 17/742,288

(22) Filed: May 11, 2022

(65) Prior Publication Data

US 2023/0367303 A1 Nov. 16, 2023

(51) Int. Cl.
*G05B 19/418* (2006.01)
*G06N 5/04* (2023.01)
*G06N 20/00* (2019.01)

(52) U.S. Cl.
CPC ........... *G05B 19/4189* (2013.01); *G06N 5/04* (2013.01); *G06N 20/00* (2019.01); *G05B 2219/31266* (2013.01)

(58) Field of Classification Search
CPC .... G06F 16/2246; G06F 8/41; G06F 16/2379; G06F 12/0207; G06F 16/9024; G06N 3/04; G06N 3/063; G06N 20/00
See application file for complete search history.

(56) References Cited

U.S. PATENT DOCUMENTS

2007/0088731 A1* 4/2007 Chant ................... G06F 16/282
2013/0315475 A1 11/2013 Song et al.

2016/0335303 A1* 11/2016 Madhalam .......... G06F 16/2455
2018/0121766 A1 5/2018 McCord et al.
2018/0374021 A1 12/2018 Drayton et al.
(Continued)

FOREIGN PATENT DOCUMENTS

WO WO-0146866 A2 * 6/2001 ......... G06F 16/2465
WO WO 20200040763 2/2020

OTHER PUBLICATIONS

Gu Jinyuan, et al. "Channel assignment strategy based on hierarchy interference model in cognitive wireless mesh networks," 2010 International Conference on Networking and Digital Society, Wenzhou, China, 2010, pp. 232-236 https://ieeexplore.ieee.org/document/5479149?source=IQplus (Year: 2010).*
(Continued)

*Primary Examiner* — Jerry O'Connor
*Assistant Examiner* — Michael R Koester
(74) *Attorney, Agent, or Firm* — Klarquist Sparkman, LLP

(57) ABSTRACT
Techniques and solutions are provided for encoding information for sets, including sets whose elements are arranged in a hierarchy. Values are defined for different levels of a hierarchy, where the values increase or decrease from a root of the hierarchy. A flattened representation of the hierarchy is generated by multiplying element values by a level value for a level at which a respective element is located. Values for parent and leaf nodes are defined, and a flattened representation of the hierarchy is generated by multiple elements values by the parent value or the leaf node value, depending on whether a respective elements is a parent or leaf node. Quantity values for a set of elements are encoded by adding a quantity of a given element to a value assigned to elements of a set definition that are present in a set.

20 Claims, 27 Drawing Sheets

(56)                    References Cited

U.S. PATENT DOCUMENTS

| | | | |
|---|---|---|---|
| 2019/0096217 A1 | 3/2019 | Pourmohammad et al. | |
| 2020/0057675 A1 | 2/2020 | Dias et al. | |
| 2020/0125992 A1* | 4/2020 | Agarwal | G06N 3/084 |
| 2020/0265025 A1* | 8/2020 | Krishnan | G06N 3/09 |
| 2023/0366086 A1 | 11/2023 | Clark et al. | |
| 2023/0368085 A1 | 11/2023 | Clark et al. | |
| 2023/0420938 A1* | 12/2023 | Cheim | G06Q 10/0639 |
| 2024/0165731 A1 | 5/2024 | Zhou et al. | |

OTHER PUBLICATIONS

Priore et al., "Dynamic scheduling of manufacturing systems using machine learning: An updated review," Artificial Intelligence for Engineering Design, Analysis and Manufacturing (2014), 28, pp. 83-97, 15 pages.

Jiao et al., "Identifying generic routings for product families based on text mining and tree matching," Decision Support Systems, Apr. 2007, https://doi.org/10.1016/j.dss.2007.01.001, 2 pages.
Non-Final Office Action received in U.S. Appl. No. 17/742,285, Jun. 2, 2025, 97 pages.
Abidi et al., "Optimal scheduling of flexible manufacturing system using improved lion-based hybrid machine learing approach," IEEE Access 8 (2020) 96088-96114 (Year 2020).
Li et al., "Machine learning and optimization for production rescheduling in Industry 4.0," The International Journal of Advanced Manufacturing Technology 110.9 (2020) 2445-2463 (Year 2020).
Dabiri et al., "Semi-Supervised Deep Learning Approach for Transportation Mode Identification Using GPS Trajectory Data," IEEE Transactions on Knowledge & Data Engineering 32.05 (2020) 1010-1023 (Year 2020).
Non-Final Office Action received in U.S. Appl. No. 17/742,292, May 21, 2025, 26 pages.
Final Office Action received in U.S. Appl. No. 17/742,285, Oct. 9, 2025, 102 pages.

* cited by examiner

| Flat Gasket | | Screw | | | Fly Wheel | | | |
| Flat Gasket | | Screw | | | | Lug for Spiral Casing | | Fly Wheel (Stainless Steel) | |
| Material_Flat_Gasket | Heat_Resistance | Weight | CylHeadHt | TurbineDia | Pressure_SS | FlowRate_SS | MaterialFW | FW Weight |
|---|---|---|---|---|---|---|---|---|
| Nitrile Rubber Binder | 716 | 10.73 | 3.3 | 100 | 12 | 0.0775 | Carbon Fiber | 10 |
| Titanium | 587 | 10.41 | 2.8 | 130 | 35 | 1.755 | Titanium Alloys | 15 |
| Titanium Alloys | 838 | 11.22 | 3 | 135 | 49 | 3.029 | Tungsten Carbide | 12 |
| Carbon Steels with Pla... | 537 | 9.5 | 2.8 | 130 | 40.5 | 2.933 | Carbon Steels with Nic... | 10 |
| Carbon Steels with Pla... | 590 | 12.7 | 2.8 | 130 | 25 | 1.109 | Titanium | 15 |
| Carbon Steels with Nic... | 884 | 11.22 | 42 | 120 | 7.5 | 0.0469 | Titanium Alloys | 8 |
| Nitrile Rubber Binder | 537 | 10.41 | 3 | 110 | 36 | 0.9526 | Carbon Steels with Pla... | 10 |
| Titanium | 830 | 9.5 | 3 | 135 | 14 | 0.4840 | Carbon Steels with Pla. | 15 |
| Titanium Alloys | 536 | 12.9 | 3.2 | 120 | 22.5 | 0.6941 | Carbon Steels with Nic... | 12 |
| Carbon Steels with Pla... | 596 | 10.41 | 2.8 | 110 | 40 | 0.1919 | Titanium Alloys | 10 |
| Carbon Steels with Pla... | 523 | 11.22 | 3.2 | 110 | 22.5 | 2.491 | Titanium Alloys | 15 |
| Carbon Steels with Nic... | 835 | 12.7 | 3.2 | 125 | 14 | 0.0494 | Tungsten Carbide | 8 |
| Titanium | 580 | 11.22 | 3.2 | 135 | 20 | 1.847 | Titanium | 10 |
| Titanium Alloys | 898 | 11.22 | 3 | 130 | 45 | 0.7003 | Titanium | 15 |
| Carbon Steels with Pla... | 877 | 10.41 | 42 | 130 | 37.5 | 2.482 | Tungsten Carbide | 12 |
| Carbon Steels with Pla... | 842 | 12.7 | 2.8 | 120 | 42 | 0.3482 | Titanium Alloys | 10 |
| Carbon Steels with Nic... | 583 | 12.7 | 2.8 | 120 | 45 | 1.809 | Titanium Alloys | 15 |
| Nitrile Rubber Binder | 890 | 9.5 | 3 | 110 | 22.5 | 1.443 | Titanium Alloys | 8 |
| Titanium | 837 | 12.7 | 3.5 | 130 | 70 | 4.252 | Titanium Alloys | 10 |

| Bearing Case | | Electronic | | | | |
| Ball Bearing | Bearing Case | Casing for Electronic Drive | | Circuit Board M1-100 | | Mains Adapter |
| DiameterBB | MaterialBB | Material | CasingDimensions | Power | BoardDimensions | MainsAdapterVoltage |
|---|---|---|---|---|---|---|
| 17 | Glass Fiber | PA | 115x110x70 | 15 | 12x9 | 482 |
| 15 | Glass Fiber | PC | 111x101x70 | 15 | 13x10 | 390 |
| 12 | Glass Fiber | ASA+PC | 111x101x70 | 11 | 13x10 | 361 |
| 17 | Glass Fiber | PA | 115x110x60 | 11 | 13x10 | 561 |
| 13 | Glass Fiber | PC | 115x110x60 | 15 | 13x10 | 344 |
| 17 | Glass Fiber | ASA+PC | 115x110x60 | 21 | 13x10 | 589 |
| 15 | Glass Fiber | ABS | 111x101x70 | 21 | 15x9 | 355 |
| 12 | Glass Fiber | PA | 115x110x60 | 16 | 13x10 | 543 |
| 17 | Glass Fiber | PC | 111x101x70 | 21 | 13x10 | 356 |
| 13 | Glass Fiber | ASA+PC | 115x110x60 | 16 | 13x10 | 392 |
| 15 | Glass Fiber | ABS | 115x110x60 | 21 | 15x9 | 363 |
| 12 | Steel | PA | 111x101x70 | 16 | 13x10 | 552 |
| 17 | Steel | PC | 111x101x70 | 16 | 13x10 | 391 |
| 13 | Steel | ASA+PC | 115x110x60 | 11 | 13x10 | 583 |
| 17 | Steel | ABS | 115x110x60 | 21 | 13x10 | 596 |
| 15 | Steel | PA | 115x110x60 | 15 | 13x10 | 544 |
| 12 | Steel | PC | 115x110x60 | 15 | 13x10 | 389 |
| 17 | Steel | ASA+PC | 111x101x70 | 11 | 13x10 | 589 |
| 14 | Steel | ABS | 111x101x70 | 21 | 13x10 | 554 |

| BOM Information Included: | 1: Component |
| --- | --- |
| | 2: Component Quantity |
| | 3: Hiearchy Level |
| | 4: Component=10/Assembly=20 |

714 / 712

| Fly Wheel | = | 2132 | Flat Gasket | = | 3459 | Casing | = | 4983 |
| --- | --- | --- | --- | --- | --- | --- | --- | --- |
| Bearing Case | = | 2532 | Screw | = | 2294 | Circuit | = | 3943 |
| Electronics | = | 5363 | Slug Spiral Casing | = | 2942 | Mains | = | 2943 |
| Alarm | = | 4363 | Ball Bearing | = | 2001 | Alarm | = | 3429 |

704 / 706

| 712 | 2132 | 2532 | 5363 | 4363 | 3459 | 2294 | 2942 | 2001 | 4983 | 3943 | 2943 | 3429 | 3258 | 3945 | 8453 |
| --- | --- | --- | --- | --- | --- | --- | --- | --- | --- | --- | --- | --- | --- | --- | --- |
| 714 | 1 | 1 | 1 | 1 | 1 | 1 | 1 | 1 | 1 | 1 | 1 | 1 | 0 | 0 | 0 |

720

| 722 | 10 | 5 | 2 | 10 | 1 | 1 | 8 | 100 | 200 | 20 | 30 | 5 |
| --- | --- | --- | --- | --- | --- | --- | --- | --- | --- | --- | --- | --- |
| 712 | 2132 | 2532 | 5363 | 4363 | 3459 | 2294 | 2942 | 2001 | 4983 | 3943 | 2943 | 3429 | 3258 | 3945 | 8453 |
| 714 | 1 | 1 | 1 | 1 | 1 | 1 | 1 | 1 | 1 | 1 | 1 | 1 | 0 | 0 | 0 |
| 724 | 11 | 6 | 3 | 11 | 2 | 2 | 9 | 101 | 201 | 21 | 31 | 6 | 0 | 0 | 0 |

740

| 726 | 1 | 1 | 1 | 1 | 1 | 1 | 1 | 2 | 2 | 2 | 2 | 2 | 2 | 2 | 2 |
| --- | --- | --- | --- | --- | --- | --- | --- | --- | --- | --- | --- | --- | --- | --- | --- |
| 712 | 2132 | 2532 | 5363 | 4363 | 3459 | 2294 | 2942 | 2001 | 4983 | 3943 | 2943 | 3429 | 3258 | 3945 | 8453 |
| 714 | 1 | 1 | 1 | 1 | 1 | 1 | 1 | 1 | 1 | 1 | 1 | 1 | 0 | 0 | 0 |
| 724 | 11 | 6 | 3 | 11 | 2 | 9 | 101 | 201 | 21 | 31 | 6 | 0 | 0 | 0 |
| 728 | 11 | 6 | 3 | 11 | 2 | 2 | 18 | 202 | 402 | 42 | 62 | 12 | 0 | 0 | 0 |

| 762 | 20 | 20 | 20 | 20 | 20 | 10 | 10 | 10 | 10 | 10 | 10 | 10 | | | |
|---|---|---|---|---|---|---|---|---|---|---|---|---|---|---|---|
| 712 | 2132 | 2532 | 5363 | 4363 | 3459 | 2294 | 2942 | 2001 | 4983 | 3943 | 2943 | 3429 | 3258 | 3945 | 8453 |
| 714 | 1 | 1 | 1 | 1 | 1 | 1 | 1 | 1 | 1 | 1 | 1 | 1 | 0 | 0 | 0 |
| 724 | 11 | 6 | 3 | 11 | 2 | 2 | 9 | 101 | 201 | 21 | 31 | 6 | 0 | 0 | 0 |
| 728 | 11 | 6 | 3 | 11 | 2 | 2 | 18 | 202 | 402 | 42 | 62 | 12 | 0 | 0 | 0 |
| 764 | 220 | 120 | 60 | 220 | 40 | 20 | 180 | 2020 | 4020 | 420 | 620 | 120 | 0 | 0 | 0 |

780

| 712 | 2132 | 2532 | 5363 | 4363 | 3459 | 2294 | 2942 | 2001 | 4983 | 3943 | 2943 | 3429 | 3258 | 3945 | 8453 |
|---|---|---|---|---|---|---|---|---|---|---|---|---|---|---|---|
| 782 | 0.027 | 0.015 | 0.007 | 0.027 | 0.005 | 0.002 | 0.022 | 0.251 | 0.499 | 0.052 | 0.077 | 0.015 | 0.000 | 0.000 | 0.000 |

| Observation 852 | Material_ID 854 | Location 856 | Operation 858 | Operation Description 860 | Work Center 862 | Operation Order 864 |
|---|---|---|---|---|---|---|
| 1 | 1234 | ABC | 250 | Preparation | 1 | 1 |
| 1 | 1234 | ABC | 300 | Convene Plan Flats | 2 | 2 |
| 1 | 1234 | ABC | 400 | Plan Small Build | 3 | 3 |
| 2 | 456 | ABC | 250 | Preparation | 1 | 1 |
| 2 | 456 | ABC | 300 | Convene Plan Flats | 2 | 2 |
| 2 | 456 | ABC | 400 | Plan Small Build | 3 | 3 |
| 2 | 456 | ABC | 500 | Installation | 3 | 4 |

870

| Observation 872 | Position1 874 | Position2 874 | Position3 874 | Position4 874 |
|---|---|---|---|---|
| 1 | 1 | 2 | 3 | |
| 1 | 1 | 2 | 3 | 3 |

FIG. 8B

1100

| Component Description | Operation | Work Center | Operation Description |
|---|---|---|---|
| Cover Sheet | 5 | WC-3243 | Print the Cabin |
| Cover Sheet | 5 | WC-3243 | Print the Cabin |
| Production Volume 2322 | 100 | WC-332 | Installation |
| Machine Body | 100 | WC-332 | Installation |
| Guide Bellows | 100 | WC-332 | Installation |
| Attachment Parts | 100 | WC-332 | Installation |
| Attachment Parts | 100 | WC-332 | Installation |
| Attachment Parts | 100 | WC-332 | Installation |
| Attachment Parts | 100 | WC-332 | Installation |
| Cable | 100 | WC-332 | Installation |
| Motion Unit | 100 | WC-332 | Installation |
| Set of Labels | 100 | WC-332 | Installation |
| Water Manifold | 100 | WC-332 | Installation |
| Hose Package | 100 | WC-332 | Installation |
| Attachment Parts | 100 | WC-332 | Installation |
| Hose Package | 100 | WC-332 | Installation |
| Switch Cabinet | 100 | WC-332 | Installation |
| Switch Cabinet | 100 | WC-332 | Installation |
| Switch Cabinet | 100 | WC-332 | Installation |
| Attachment Parts | 100 | WC-332 | Installation |
| Screw ISO 32 | 100 | WC-332 | Circuit Board |
| Screw ISO 32 | 100 | WC-332 | Circuit Board |
| Screw ISO 32 | 100 | WC-332 | Circuit Board |
| Screw ISO 32 | 100 | WC-332 | Circuit Board |
| Screw ISO 32 | 100 | WC-332 | Circuit Board |
| Screw ISO 32 | 100 | WC-332 | Circuit Board |
| Screw ISO 32 | 200 | WC-346 | Circuit Board |
| Cable Set Optics | 200 | WC-346 | Electrical Installation |
| Cable Set | 200 | WC-346 | Electrical Installation |

Column reference labels: 1106, 1110, 1114, 1118

| Component Description | Comp.Des.1 | Comp.Des.2 | Comp.Des.2 | Work Center | Operation Description |
|---|---|---|---|---|---|
| cover sheet | cover | sheet | | wc-3243 | print the cabin |
| cover sheet | cover | sheet | | wc-3243 | print the cabin |
| production volume 2322 | production | volume | 2322 | wc-332 | installation |
| machine body | machine | body | | wc-332 | installation |
| guide bellows | guide | below | | wc-332 | installation |
| attachment parts | attachment | parts | | wc-332 | installation |
| attachment parts | attachment | parts | | wc-332 | installation |
| attachment parts | attachment | parts | | wc-332 | installation |
| attachment parts | attachment | parts | | wc-332 | installation |
| cable | cable | | | wc-332 | installation |
| motion unit | motion | unit | | wc-332 | installation |
| set of labels | set | of | labels | wc-332 | installation |
| water manifold | water | manifold | | wc-332 | installation |
| hose package | hose | package | | wc-332 | installation |
| attachment parts | attachment | parts | | wc-332 | installation |
| hose package | hose | package | | wc-332 | installation |
| switch cabinet | switch | cabinet | | wc-332 | installation |
| switch cabinet | switch | cabinet | | wc-332 | installation |
| switch cabinet | switch | cabinet | | wc-332 | installation |
| attachment parts | attachment | parts | | wc-332 | installation |
| screw iso 32 | screw | iso | | wc-332 | circuit board |
| screw iso 32 | screw | iso | | wc-332 | circuit board |
| screw iso 32 | screw | iso | | wc-332 | circuit board |
| screw iso 32 | screw | iso | | wc-332 | circuit board |
| screw iso 32 | screw | iso | | wc-332 | circuit board |
| screw iso 32 | screw | iso | | wc-332 | circuit board |
| screw iso 32 | screw | iso | | wc-346 | circuit board |
| cable set optics | cable | set | optics | wc-346 | electrical installation |
| cable set | cable | set | | wc-346 | electrical installation |

| cover | sheet | screw | production | machine | guide | attachment | ⋯ | Operation | Work Center | Operation Description |
|---|---|---|---|---|---|---|---|---|---|---|
| 1 | 1 | 0 | 0 | 0 | 0 | 0 | ⋯ | 5 | wc-3243 | print the cabin |
| 1 | 1 | 0 | 0 | 0 | 0 | 0 | ⋯ | 5 | wc-3243 | print the cabin |
| 0 | 0 | 0 | 1 | 0 | 0 | 0 | ⋯ | 100 | wc-332 | installation |
| 0 | 0 | 0 | 0 | 1 | 0 | 0 | ⋯ | 100 | wc-332 | installation |
| 0 | 0 | 0 | 0 | 0 | 1 | 0 | ⋯ | 100 | wc-332 | installation |
| 0 | 0 | 0 | 0 | 0 | 0 | 0 | ⋯ | 100 | wc-332 | installation |
| 0 | 0 | 0 | 0 | 0 | 0 | 0 | ⋯ | 100 | wc-332 | installation |
| 0 | 0 | 0 | 0 | 0 | 0 | 0 | ⋯ | 100 | wc-332 | installation |
| 0 | 0 | 0 | 0 | 0 | 0 | 0 | ⋯ | 100 | wc-332 | installation |
| 0 | 0 | 0 | 0 | 0 | 0 | 0 | ⋯ | 100 | wc-332 | installation |
| 0 | 0 | 0 | 0 | 0 | 0 | 0 | ⋯ | 100 | wc-332 | installation |
| 0 | 0 | 0 | 0 | 0 | 0 | 0 | ⋯ | 100 | wc-332 | installation |
| 0 | 0 | 0 | 0 | 0 | 0 | 0 | ⋯ | 100 | wc-332 | installation |
| 0 | 0 | 0 | 0 | 1 | 0 | 0 | ⋯ | 100 | wc-332 | installation |
| 0 | 0 | 0 | 0 | 0 | 0 | 0 | ⋯ | 100 | wc-332 | installation |
| 0 | 0 | 0 | 0 | 0 | 0 | 0 | ⋯ | 100 | wc-332 | installation |
| 0 | 0 | 0 | 0 | 0 | 0 | 0 | ⋯ | 100 | wc-332 | installation |
| 0 | 0 | 0 | 0 | 0 | 0 | 0 | ⋯ | 100 | wc-332 | installation |
| 0 | 0 | 0 | 0 | 0 | 0 | 1 | ⋯ | 100 | wc-332 | installation |
| 0 | 0 | 1 | 0 | 0 | 0 | 0 | ⋯ | 100 | wc-332 | circuit board |
| 0 | 0 | 1 | 0 | 0 | 0 | 0 | ⋯ | 100 | wc-332 | circuit board |
| 0 | 0 | 1 | 0 | 0 | 0 | 0 | ⋯ | 100 | wc-332 | circuit board |
| 0 | 0 | 1 | 0 | 0 | 0 | 0 | ⋯ | 100 | wc-332 | circuit board |
| 0 | 0 | 1 | 0 | 0 | 0 | 0 | ⋯ | 100 | wc-332 | circuit board |
| 0 | 0 | 1 | 0 | 0 | 0 | 0 | ⋯ | 100 | wc-332 | circuit board |
| 0 | 0 | 1 | 0 | 0 | 0 | 0 | ⋯ | 200 | wc-346 | circuit board |

FIG. 13

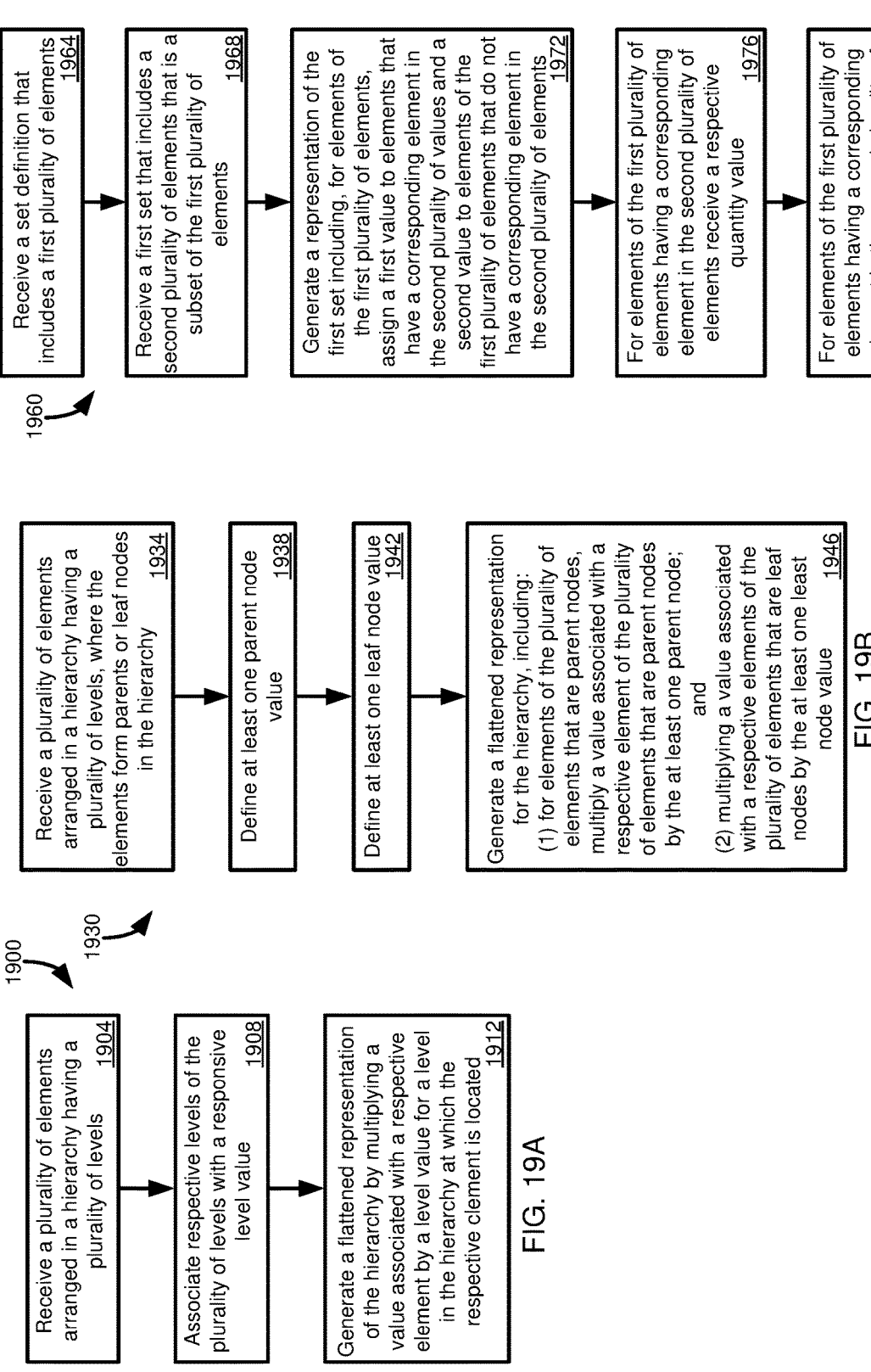

Receive a set definition that includes a first plurality of elements    1964

Receive a first set that includes a second plurality of elements that is a subset of the first plurality of elements    1968

Generate a representation of the first set including, for elements of the first plurality of elements, assign a first value to elements that have a corresponding element in the second plurality of values and a second value to elements of the first plurality of elements that do not have a corresponding element in the second plurality of elements    1972

For elements of the first plurality of elements having a corresponding element in the second plurality of elements receive a respective quantity value    1976

For elements of the first plurality of elements having a corresponding element in the second plurality of elements, add the respective quantity value to the first value    1980

Receive a plurality of elements arranged in a hierarchy having a plurality of levels, where the elements form parents or leaf nodes in the hierarchy    1934

Define at least one parent node value    1938

Define at least one leaf node value    1942

Generate a flattened representation for the hierarchy, including:
(1) for elements of the plurality of elements that are parent nodes, multiply a value associated with a respective element of the plurality of elements that are parent nodes by the at least one parent node; and
(2) multiplying a value associated with a respective elements of the plurality of elements that are leaf nodes by the at least one least node value    1946

Receive a plurality of elements arranged in a hierarchy having a plurality of levels    1904

Associate respective levels of the plurality of levels with a responsive level value    1908

Generate a flattened representation of the hierarchy by multiplying a value associated with a respective element by a level value for a level in the hierarchy at which the respective element is located    1912

COMPUTING ENVIRONMENT 2000

COMMUNICATION CONNECTION(S) 2070

INPUT DEVICE(S) 2050

OUTPUT DEVICE(S) 2060

STORAGE 2040

2030 graphics or co-processing unit 2015 central processing unit 2010

MEMORY 2025

MEMORY 2020

SOFTWARE 2080 IMPLEMENTING DESCRIBED TECHNOLOGIES

2100

ENCODED HIERARCHY REPRESENTATION AND METHOD OF GENERATING SAME

FIELD

The present disclosure generally relates to encodings for elements of a set, including for sets having hierarchically arranged elements. Particular implementations provide techniques for encoding quantity information for a set or for encoding information about hierarchical levels of set elements or about relationships between hierarchically arranged set elements.

BACKGROUND

Many processes include routing resources between locations where the resources are maintained or processed. As an example, a computing process may need to obtain data from a variety of computing systems or devices, where the systems and devices may be connected using a computing network. Similarly, processing may be carried out at various computing systems and devices.

Similar issues arise in manufacturing. A final output, such as a vehicle, may be produced from many intermediate components, which in turn are produced from other intermediate components or from base resources. Base resources and intermediate components may be processed at different processing resources, and may involve many operations.

Routing processes can be very complex—consider the large number of components used in vehicle manufacturing. When a new routing process is to be carried out, such as for a particular set of inputs, it can be very complicated to determine how the new routing process should be arranged, including what processing resources and operations will be needed, or a sequence in which these processing resources and operations will be used. Similar issues can arise in modifying an existing routing process. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are provided for encoding information for sets, including sets whose elements are arranged in a hierarchy. Values are defined for different levels of a hierarchy, where the values increase or decrease from a root of the hierarchy. A flattened representation of the hierarchy is generated by multiplying element values by a level value for a level at which a respective element is located. Values for parent and leaf nodes are defined, and a flattened representation of the hierarchy is generated by multiplying element values by the parent value or the leaf node value, depending on whether a respective elements is a parent or leaf node. Quantity values for a set of elements are encoded by adding a quantity of a given element to a value assigned to elements of a set definition that are present in a set.

In one embodiment, the present disclosure provides a method of creating a flattened representation of a hierarchy that encodes level information for the hierarchy. A plurality of elements are received that are arranged in a hierarchy having a plurality of levels. Respective levels of the plurality of levels are associated with respective level values. The level values differ for respective levels of the hierarchy and increase or decrease from a root of the hierarchy to a lowest level of the hierarchy. A flattened representation of the hierarchy is generated, including, for elements of the plurality of elements, multiplying a value associated with a respective element by a level value for a level in the hierarchy at which the respective element is located.

In another embodiment, the present disclosure provides a method of generating a flattened representation of a hierarchy that captures, for individual elements of the hierarchy, relationships with other hierarchy elements. A plurality of elements are received that are arranged in a hierarchy having a plurality of levels. Elements of the hierarchy form parent nodes or leaf nodes of the hierarchy. At least one parent node value is defined, and at least one leaf node value is defined. A flattened representation of the hierarchy is generated including, for elements that are parent nodes, multiplying a value of a respective element by the at least one parent node value and, for elements that are leaf nodes, multiplying a value of a respective element by the at least one leaf node value.

In a further embodiment, the present disclosure provides a method of encoding quantity information for elements of a set. A set definition that includes a first plurality of elements is received. A first set comprising a second plurality of elements is received, where the second plurality of elements is a subset of the first plurality of elements. A representation of the first set is generated, including assigning a first value to elements of the first plurality of elements having a corresponding element in the elements of the second plurality of elements, and assigning a second value, different than the first value, to elements of the first plurality of elements that do not have a corresponding element in the elements of the second plurality of elements. Respective quantity values for elements of the first plurality of elements having a corresponding element in the second plurality of elements are received. For elements of the first plurality of elements having a corresponding element in the elements of the second plurality of elements, the respective quantity value is added to the first value.

The present disclosure also includes computing systems and tangible, non-transitory computer readable storage media configured to carry out, or including instructions for carrying out, an above-described method. As described herein, a variety of other features and advantages can be incorporated into the technologies as desired.

BRIEF DESCRIPTION OF THE DRAWINGS

FIGS. 4C and 4D further illustrates how inputs for a routing can be associated with characteristics information.

FIGS. 7A and 7B illustrate how hierarchical information for a set of inputs, including the presence of absence of an input, a hierarchical level of an input, and relationships between inputs, as well as component information, can be encoded in a flattened representation.

FIG. 8B illustrates additional ways of encoded processing resource sequence information.

FIG. 11 is table illustrating how information regarding inputs and operations performed on the inputs can be represented.

FIG. 12 is a table illustrating how descriptive information for inputs can be formatted for use in generating or using a machine learning model.

FIG. 13 is a table illustrating how inputs in a set of data can be represented and associated with particular operations at particular processing resources.

FIG. 19A is a flowchart of a method useable to create a flattened representation of a hierarchy that encodes level information for hierarchy elements.

FIG. 19B is a flowchart of a method useable to create a flattened representation of a hierarchy than encodes relationship information for hierarchy elements.

FIG. 19C is a flowchart of a method useable to create a representation of a set that encodes quantity information for set elements.

DETAILED DESCRIPTION

Example 1—Overview

Figure 1:
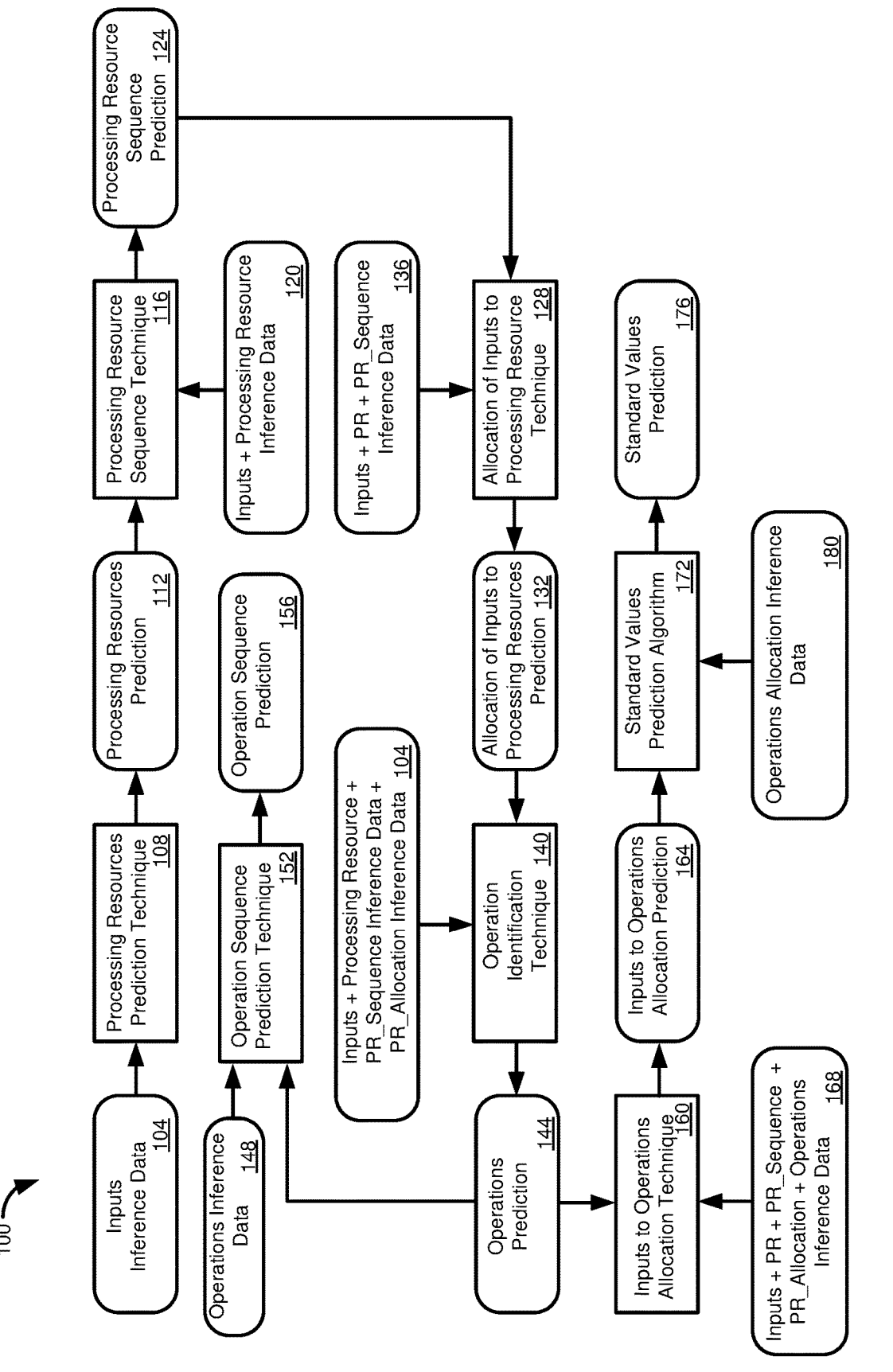
FIG. 1 is a flowchart of an integrated process of predicting various elements of a routing process.

Many processes include routing resources between locations where the resources are maintained or processed. As an example, a computing process may need to obtain data from a variety of computing systems or devices, where the systems and devices may be connected using a computing network. Similarly, processing may be carried out at various computing systems and devices.

As another example, manufacturing processes can be very complex. Modern devices, from automobiles to smartphones, can include large number of parts that are sourced from a large number of locations. These parts may need to be transported to various facilities, or locations within a facility, for processing. The output of earlier processing steps may be an intermediate component that is in turn subject to further processing or transport. Taking the example of an automobile, engines and drivetrains may be produced at completely separate locations. In turn, the engines and drivetrains themselves consist of components that may be produced from many different materials or components and be sourced from different locations. The engines and drivetrains can be shipped to a facility where they are combined with the body of an automobile to produce a finished product.

Processes can be very complex, as illustrated by the automobile manufacturing example. When a new process is to be carried out, it can be very complicated to determine how the process should be arranged, including where resources should be obtained from, what process steps might be needed, where the process steps should occur, an order in which the process steps should be carried out, or how resources, should be allocated to locations or particular operations needed to generate an output. As an additional consideration, even when a sequence of operations is known, scheduling various operations can be challenging, as it may not be known, for instance, how much time should be allocated to a particular operation, or how much labor or other resources needed to complete an operation (apart from inputs, such as physical inputs) will be needed. Accordingly, room for improvement exists.

Routing, as described here, is an overall process, that may be composed of multiple subprocesses (which form elements of the routing), of producing one or more outputs from one or more inputs. Broadly speaking, an input can be anything that can be transported or processed. So, data can be an input, as can analog world materials and components. An input can be a "starting," "base," or "raw" input, or can be an input that has been processed in some way or is created using other inputs of a routing. "Base" inputs can include other inputs, but their process of production is "out of scope" for the routing. An engine, for example, could be an "intermediate input" of an automobile if the engine is produced by the routing, but would be considered a "base input" if it was obtained from a third party supplier (or even if produced by a same organization, but using a disconnected routing process).

Inputs that have been processed in some way can be referred to as "intermediate inputs." Intermediate inputs can themselves be outputs of a component process or subprocess of a larger process. Note that disclosed techniques need not be limited to an overall process that includes subprocesses. For example, a subprocess can be treated as an independent process for purposes of applying disclosed techniques.

In general, a routing includes elements of a collection of inputs, a set of processing resources that processes the inputs to produce an output, a set of operations performed by the processing resources, and information regarding how processing resources and operations are sequenced. A routing can further include, or be produced using, various metrics associated with the operations, such as a time needed to complete an operation.

Given all the aspects that may be involved in developing a routing to produce an output from a set inputs, it can be seen that routings can grow very complicated very quickly. Developing routings from the ground up can be very time consuming, and can require significant experience and expertise. In particular, it may be difficult for a user to have knowledge of a process viewed at a high level and know details about various process inputs or operations. Along with routings being time consuming to develop, their complexity can result in developed routings that have errors or are suboptimal. The same considerations can apply in modifying an existing routing. In the case of computer-implemented process, suboptimal routings can lead to wasted computing resources.

The present disclosure provides a number of technologies that can be used to develop (including creating from nothing or augmenting an existing routing) or modify routings. The technologies can be used alone or in various combinations. Generally, the techniques can be categorized as those that relate to (1) determining a set of processing resources that will be used to produce an output from a set of inputs; (2) how the processing resources will be sequenced; (3) a set of operations to be performed by the processing resources on the inputs; (3) how the operations should be sequenced; (4) how inputs should be allocated to processing resources and operations; and (5) those that determine metrics, such as standard values, associated with the operations (such as an expected time to complete an operation, a time to set up an element of a processing resource, such as a machine, to perform the operation, a time the machine will operate on the resource, and other expected resource usage times—such an amount of human labor required to perform the operation).

The disclosed techniques leverage information from existing routings, such as historical routings or simulated routings. That is, existing routings (whether currently in use or not) contain information regarding inputs in the routings along with information about processing resources, operations, input allocations, sequencing information, and standard values. This information can be used in developing predictive models, including using machine learning techniques, or in conducting a similarity analysis. Existing sequencing information can also be used to generate a transition model that can predict sequencing information for a new or modified routing.

Many disclosed techniques use input information in model generation or in generating a prediction given a set of inputs (inference data). The input information can be maintained at different levels of granularity. As an example, taking an input for a manufacturing process, a "pump" can be an intermediate level of granularity, while a particular pump model can be a more granular level and "hydraulics" or "flow control" may be a more general classification (genus) that includes the pump (species).

One issue that can arise in generating routing predictions is that the amount of existing routing data that might be available for training purposes. For instance, assume that twenty historical routing instances are available that include a "pump" as a component. If different "pump" characteristics do not have a significant effect on routing, then, putting aside other considerations, it may be acceptable to use all twenty instances of historical data as training data. On the other hand, if different pumps (different pump models, or pumps having different characteristics—such as flow rate or pumps using different types of pumping mechanisms) do have a significant effect on routing, then it may only be possible to use historical data for a same pump model as training data. However, if this type of analysis is carried out for every input, then very few instances of available routing data may be relevant to inputs in inference data.

The present disclosure provides techniques that can be used to increase the amount of existing data that can be used as training data (either being included in a pool of training data at all, or being in a pool of training data and having a sufficient relationship to inputs in inference data such that training data is practically useable in producing a prediction), as well as to improve the accuracy of routing predictions. Rather simply using an input type, whether a general classification or using a more specific identifier (e.g., an identifier for a particular pump model), characteristics of an input can be used instead of/in addition to input identifiers or classifications. Thus, continuing the example of a pump, an analysis algorithm, such as a machine learning algorithm, might use pump characteristics such as pump input/output volume, pump material, and pump mechanism type to determine how a routing should be configured for a pump in a set of inference data using the characteristics of that pump. Moreover, using characteristics can allow more diverse inputs to be used for model training and inference purposes—other inputs that have similar properties as a pump (such as a flow rate, or where an operation is based on a material type, such as drilling, and it does not matter whether the material being drilled is being use in a pump or an engine) can be included in a set of training data (or data available for a similarity analysis).

A collection of routing inputs, which can be referred to as a "bill of materials" (even though "materials" can include data, in the case of processes that are at least partly computer implemented), can have other characteristics that can be used to predict routing properties of a set of test routing inputs. For example, a quantity of a particular input can be used to indicate that some historical data is more or less closely related to test input. Typically, training data will be considered more relevant to inference data if a number of components in the training data is more similar to a number of inputs in inference data.

Inputs used in a routing typically have a hierarchical relationship, such as in the example of a car produced using a body, engine, and drivetrain, where these components themselves are formed from multiple inputs at a lower level of an input hierarchy. Examples of input sets, how the inputs sets can be arranged hierarchically, and how input sets can be correlated with/assigned to different operations, and these operations sequence, are provided in U.S. Pat. No. 11,243,760, incorporated herein to the extent not inconsistent with the present disclosure. As an example, if a set of inference data includes a bolt used in an intermediate component, training data that includes the bolt in an intermediate component may be considered more relevant than if the bolt is used directly in producing an output. In this case, the bolt in the training data could also be classified at a lower level of a hierarchy, making it somewhat more dissimilar to the bolt in the inference data at a higher level of the hierarchy.

Existing data, as well as inference data, can be encoded/formatted to assist in its processing, such as being encoded for use in a machine learning algorithm. In the case of hierarchical information, the present disclosure provides techniques that can be used to encode information about a level in which an input appears and whether the input is an intermediate input (for example, an assembly or subassembly where the input would have "child" inputs). Techniques are also provided to encode a quantity of an input. For instance, training data could indicate that a bolt is used in producing an intermediate input, but more accurate predictions might result if the training data is encoded to indicate that five of the bolts are used in producing the intermediate input.

A variety of information about a routing can be encoded in the form of bit vectors. For example, a total set of available processing resources and operations can be defined and, for particular data sets, a bit can be set to 1 if the processing resource was used/operations occurred or to 0 otherwise. Certain aspects of a routing, such as inputs or operations, have descriptions designed at least in part of use by a human. These descriptions can be difficult to use with predictive models. Accordingly, the present disclosure provides techniques that can be used to standardize descriptions and then encode description information in way that can be used in modelling techniques. In a particular example, a set of descriptive terms is defined and a bit vector is generated where a value for a term is set to 1 if it occurs in a set of data and 0 otherwise.

The present disclosure provides machine learning techniques that can be used to predict various aspects of a routing, but other modelling or prediction techniques can be used, in place of, of in addition to, machine learning models. For instance, in some cases sequencing information can be more easily or accurately determined using transition analysis than using machine learning. A transition probability matrix can be constructed using training data. A sequence of operations, such as for a particular processing resource, can be expressed as a series of transitions from one state (operation) to another state (operation). As an example, consider a processing center on which operations a, b, and c can be conducted. Possible transitions include, among others, a→b, a→c; b→c. The probability matrix can weight particular transitions with a number of times it is observed in a set of training data.

As another example, such as in cases where insufficient training data may be available, it may be beneficial to use a similarity analysis to identify one or more existing routings that are similar to inputs in inference data. Techniques are provided that allow a routing determination process to switch between different modelling techniques, including switching between machine learning models or switching between machine learning and other types or prediction techniques.

Example 2—Example Overall Routing Prediction Process

FIG. 1 provides a flowchart 100 illustrating how various aspects of a routing can be determined. Generally, the flowchart 100 includes a variety of prediction techniques for different routing aspects, which can use different inputs. In some cases, some or all of the prediction techniques can be sequentially executed from processing an initial set of inference data, for example, inputs in a production order or bill of materials. The output of one prediction technique can be used as input for another prediction technique. In other cases, prediction techniques can be accessed out of order, and in either case not all prediction techniques need be executed.

For example, an initial prediction technique can determine processing resources that will be used for a set of inputs. A set of processing resources, along with the input data, can be used with a prediction technique to determine a sequence in which processing resource can be used. The output of the processing resource prediction technique can be used as the input for processing sequence prediction. Or, input data and processing resources can be determined in another way, such as using another computer-implemented method or using manual allocation/selection of processing resources, and used as input for the processing resource sequence prediction technique. Providing different data as input to a given prediction technique can produce predictions that have differing accuracies, and which can use different levels of computing resources.

In practice, various implementations of the flowchart 100 can be considered for a particular purpose and the flowchart modified to balance a desired level of prediction accuracy with a desired level of computing resource usage (including configuring the flowchart so that a given prediction can be calculated within a desired time period—an implementation of the flowchart that takes hours to run may provide the most accurate predictions, but it may not be feasible for users or processes to wait that long for results, and so a faster, but less accurate, implementation of the flowchart may be selected).

Various changes can be made to the flowchart 100. In particular, at least certain steps can be carried out in a different order, and the inputs provided to a particular prediction technique can vary. For instance, when determining operations that might be used in processing a set of inputs, the inputs and a set of processing resources used in processing the inputs can be provided to a prediction technique, or the inputs, processing resources, and a sequence in which processing resources are used can be provided.

While the disclosed techniques are not limited to production processes, for the sake of convenient presentation, and to assist in understanding the disclosed technologies, disclosed techniques will be discussed using the specific example of production processes that include a bill of materials having particular inputs/components/resources that are processed at various work centers, and where at least some of the work centers carry out multiple operations on multiple components (inputs) of the bill of materials, including where some of the components represent intermediate components generated by earlier processing operations.

However, the disclosed techniques, as has been mentioned, are not limited to manufacturing processes, and generally can find use in a variety of scenarios where inputs are processed. For example, computing processes, including those carried out in a networked environment, can have a variety of inputs and processing resources, even though the inputs may not be typically thought of as a "bill of materials" (BOM) and the processing resources might not normally be thought of as "work centers."

As an example, consider a computer implemented process that renders images on a webpage or application. Given an image file as an input, an image file may be processed using an image-processing application or routine in order to color correct, resize, or crop an image, among other possible operations. These operations can occur in different orders. The image may also be sent to a web or application rendering process, which, for example, may superimpose the image on a canvas that contains other content and then render, or make available for rending, a final display.

At 108, a processing resources prediction technique, such as a trained machine learning model, receives inputs inference data 104, such as inputs in a production order or bill of materials. The processing resources production technique produces a processing resource prediction 112. In the case of a production order, the processing resources prediction 112 can indicate various work centers that will be used to process the inputs in the BOM, such as work centers where various assembly, installation, fabrication, or machining operations may take place. The work centers can be in a same general physical location, such as a factory, or can be at different physical locations. Inputs, including intermediate inputs, can be transported between work centers (whether at a same general physical location or not) or within a work center (such as to move components to where different operations within a work center will be performed).

The processing resource prediction 112 is provided, typically along with the inputs inference data 104, as input to a processing resource prediction technique that operates at 116. Alternatively, input and processing resource inference data 120 is provided to the processing resource prediction technique that operates at 116, where the input data can be the inference data 104 "labelled" with processing resources that were manually determined or determined using a different process than shown in FIG. 1. The processing at 116 produces a processing resource sequence prediction 124. The processing resource sequence prediction 124 indicates an order in which inputs are expected to be routed to different processing resources, such as having intermediate components produced at one work center before moving to another work center for incorporation of the intermediate components into a final product or an intermediate component that is at a higher level in a BOM hierarchy.

The processing resource sequence prediction 124, typically along with the inputs inference data 104, is provided to a prediction technique that performs processing at 128 to generate a prediction of an allocation of inputs to processing resources 132. In some cases, rather than using the processing resource sequence prediction 124, processing at 128 can operate on the input inference data 104 alone, or the inference data in combination with the processing resource prediction 112. Or, inference data 136, such as the inference input data 104 combined with processing resource data, and optionally processing resource sequence data, can be provided to the prediction technique for processing at 128.

The prediction of an allocation of inputs to processing resources 132, optionally with the processing resource sequence prediction 124, can be processed at 140 using an operation identification technique to provide an operations prediction 144. In other implementation, other inference data 148 can be used in the processing at 140. For example, the inference data 104, or the inference data combined with the processing resources prediction 112 (optionally also combined with the processing resource sequence prediction 124), can be provide to the prediction technique used in the processing at 140.

The operations prediction 144 can be used for multiple purposes. One way the operations prediction 144 can be used, or operations inference data 148 (e.g., operations that are manually specified or determined through another process), is by providing such data to an operations sequence prediction technique for processing at 152. The operations sequence prediction technique can be, in particular implementations, a transition probability matrix or a similarity analysis. Optionally, the operations prediction 144 or the inference data 148 can include processing resources or processing resource prediction data. The processing at 152 produces an operations sequence prediction 156. The operations sequence prediction 156 provides, depending on the nature of the processing 152, or the inference data used for such processing, an overall order in which operations will be performed or an order that is further segmented by processing resource (e.g., first operation, second operation, etc. at processing resource one, first operation, second operation, etc. at processing resource two, and so on).

The operations prediction 144, along with the inference data 104 (and optionally other input, such as processing resources or processing resource sequence productions) can also be used as inference data for an input to operations allocation technique that processes the inference data at 160 to provide a predicted allocation of inputs to operations 164. Alternatively, inference data 168 is provided for processing at 164, where the inference data includes operations, along with inference data 104, optionally with additional information such as information about processing resources or processing resource sequencing.

The predicated allocation of inputs to operations 164 can be provided to a technique that provides, as a result of processing 172, a prediction 176 of standard values associated with the operations. The prediction 176 can provide estimates of times associated with various operations, such as a time to set up a machine, a time the machine will operate to execute the operation, and human labor or other resources that will be used as part of the operations. Among other things, the standard values can be used to help schedule various routings with respect to one another, as well as scheduling operations within a routing. For example, if it is known that a machine will be required for twenty minutes for an operation B, and that an operation A should be completed before operation B can occur, the machine can be reserved for use for operation B of that routing, but the machine can be available for other routings before and after the duration the machine is used for operation B of that routing. The standard values can also be used to ensure that sufficient human resources are allocated for a routing, and can be used in determining information such as an overall time or cost to complete a routing.

Alternatively, the standard values prediction 176 can be produced using other input for the processing at 172. Inference data 180 can be provided for use in the processing at 168, such as an assignment of inputs to operations produced manually or using another process. The predicted allocations of inputs to operations 164, or corresponding data provided as part of the inference data 180, can include other information, such as information describing operations or information about a processing resource that is associated with a particular operation (i.e., an identifier of a particular work center where a given operation is to occur). For example, the identity of a work center may affect the setup, machines, and labor times, such as if a first type of equipment for an operation is located at a first work center and a second type of that equipment is located at a second work center. The first type of equipment may be, for instance, a newer piece of equipment that is faster to use (setup and/or actual use) or requires fewer human resources.

Note that the predictions 112, 124, 132, 144, 156, 164, 176 can represent portions of an initial routing plan. It could be that portions of the routing plan may be inaccurate or incomplete, but these can optionally be manually addressed or addressed through other processes. However, having an initial routing configuration can still save a user significant time and effort, and can be more accurate than a model developed in a completely manual manner.

Various types of inferences described in the flowchart 100 can be implemented using artificial intelligence/machine learning techniques. Although the present disclosure is not limited to any specific technique, example techniques are provided herein. In particular, predicting of processing resources, operations, and sequencing information for processing resources or operations (as at 108, 116, 140, 152) can use techniques such as naive Bayes classification using kernel density estimation, light gradient boosting machine (GBM) classifiers, support vector machines (SVM) classifiers, and random forest algorithms. Determining how inputs may be allocated to processing resource or operations (such as at 128, 160) can use techniques such as naive Bayes classification using kernel density estimation or light gradient boosting machine (GBM) classifiers. Estimating standard values for operations (such as at 172) can include techniques such as random forest regressor and M5 model tree algorithms.

Figure 2:
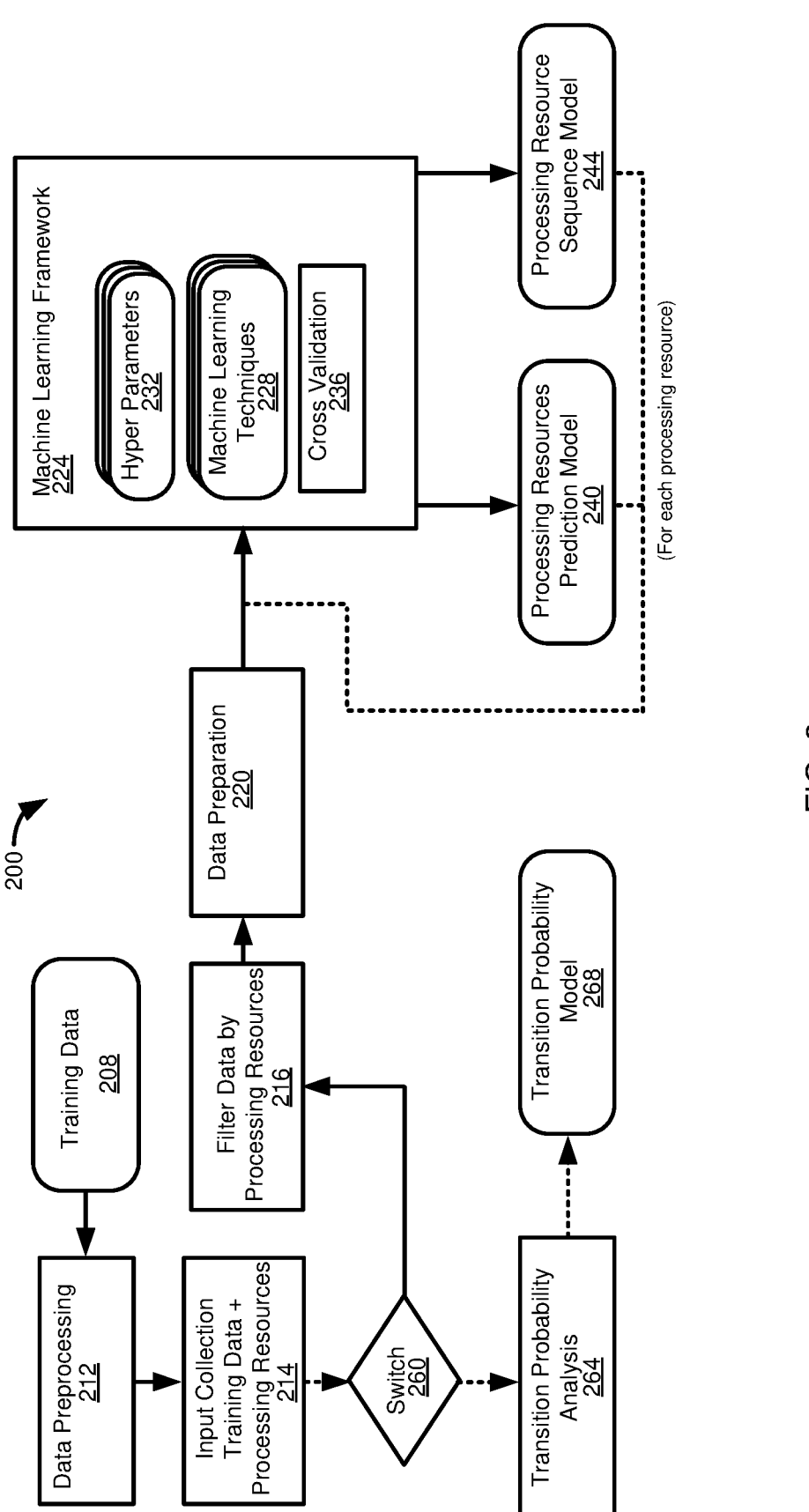
FIG. 2 is a flowchart of a process for training models to predict processing resources or processing resource sequence information of a routing process.

Example 3—Example Training and Use of Model
to Obtain Processing Resources Prediction or
Processing Resource Sequence Prediction FIG. 2 provides a flowchart of a process 200 for obtaining a prediction of resources, or processing resource sequencing, for a particular set of inputs. The process 200 can represent the processing 108 or 116 of FIG. 1, and the output can correspond to the processing resources prediction 112 or the processing resource sequence prediction 124.

Training data 208 undergoes data preprocessing at 212. The nature of the training data 208 can depend on the particular model that is being built. When a model is being prepared for use in a processing resources prediction, the training data 208 can include inputs along with particular processing resources that were used in corresponding training data routings for those inputs. In the case of training a model for processing resource sequence prediction, the training data can include processing resources labelled with processing resource sequence information, optionally also including inputs associated with instances of training data.

Data preprocessing 212 can perform various operations on the training data 208. As explained in Example 1, in many routings, including routings in manufacturing processes, inputs or components of a final "product" can have a hierarchical relationship. These hierarchical relationships can be unsuitable for at least some prediction techniques. Accordingly, the data preprocessing operations at 212 can "flatten" hierarchical input data. In at least some aspects, this flattening process encodes information about the original hierarchical relationship in the flattened data, so that the hierarchical relationships can be used to improve prediction quality.

The output of the data preprocessing at 212 can be combined with processing resource labels, if not included in the training data 208, to provide combined input collection and processing resource training data 214. The combined input collection and processing resources training data 214 can be filtered at 216 by processing resource. That is, from initial instances of training data, further instances can be created, one for each processing resource used in a given training data instance.

The preprocessed, filtered training data can be processed using one or more data preparation techniques at 220, including feature extraction techniques, removing null values, providing an alternative representation of a sparse matrix, looking for imbalances in the data (and using oversampling or undersampling to address those imbalances), or transforming data (such as using data discretization or normalization). For feature extraction, data preparation at 220 can include removing components that are found not to have sufficient predictive power (such as using SHAP or LIME values) or removing highly correlated inputs. Identifying important inputs can also use techniques such as recursive feature elimination, information gain ratio models, and principal component analysis.

In one aspect, feature extraction can include extracting features at different hierarchical levels of an input collection. That is, it may be possible, and less processing intensive and more accurate, to analyze components of an input collection in groups rather than analyzing all components individually. As an example, in the case of producing an automobile, it could be that a certain bolt is used in an engine and in a drivetrain. By only analyzing the bolts, it may be difficult to determine whether the bolt should be assigned to a processing resource associated with engine manufacture, with drivetrain manufacture, or some other processing resource that might have also used the particular bolt in the training data set.

On the other hand, if the unit of assignment is an engine, it may be simpler to determine that the engine is associated with one processing resource and not another processing resource that is used in producing drivetrains. If the engine can be assigned to the processing resources, all components of the engine can be assigned to the processing resource.

Similarly, information embedded in a hierarchy of an input collection can be used to help determine particular operations that may be needed at involved processing resources, and in assigning components or subcomponents to particular operations at a particular processing resource. For example, assuming a particular processing resource performs six operations on an engine, it may be determined that the bolt is only used in one of these six operations, making it easier to assign the bolt to a particular operation. Determining operations at a processing resource and assigning inputs to such operations can also be facilitated by first determining the processing resources, as that can greatly constrain the operations that might be used, allocation of inputs to such operations, and other parameters, such as an order of operations.

The output of the data preparation 220 is provided for processing by components of a machine learning framework 224. The machine learning framework 224 can include one or more machine learning techniques 228. The machine learning techniques 228 can in turn be associated with hyperparameters 232. The hyperparameters 232 can be used to help tune (i.e., improve the performance/predictive accuracy of) the machine learning techniques 228.

The machine learning framework 224 can also include one or more cross validation techniques 236. The cross-validation techniques 236 can be used to test the performance of models generated using the machine learning techniques 228. Part of the training data 208 can be used for model training and another part of the training data can be used for model testing—to see if the prediction provided by a model corresponds to the actual values (labels) in the training data.

Training of one or more of the machine learning techniques 228 provides one or more processing resources prediction models 240—models that can be used to predict processing resources that may be used in routing given an inference data set of inputs for an unknown routing.

When the training data 208 includes sequence information, the output of one or more machine learning techniques 228 is a processing resource sequence model 244. The processing resource sequence model 244 can be used to obtain predictions of a sequence in which various processing resources will be used for a given set of inference data in the form of inputs for a particular routing. In some cases, the training data 208 includes processing resource information and processing resource sequence information, in which case a model produced by the machine learning techniques 228 can provide a prediction of both processing resources to be used and a sequence in which the processing resources are expected to be used. In other cases inference data in the form of a collection of inputs can be first used to obtain a prediction of processing resources using a processing resource prediction model 240. The processing resource prediction can then be combined with the inputs inference data and processed using the processing resources sequence model 244 to provide a predicted sequence in which the processing resources will be used.

It should be noted that a single processing resource prediction model 240 and a single processing resource sequence model 244 are shown in FIG. 2. In practice, multiple of the models 240, 244 can be provided. For one or both of the models 240, 244, individual models can be provided for individual processing resource. Inference data can be submitted to models 240, 244 for each processing resource in order to determine what processing resources are predicted to be used, and a predicted order.

Multiple models 240, 244 can also optionally be provided that correspond to the use of different machine learning techniques 228 or the same machine learning technique using different values for the hyperparameters 232. During an inference, different versions of the models 240, 244 can be evaluated, including by processing at least a portion of the inference data to determine a model that should be used to provide a particular prediction.

Some predictions for a routing may be provided using techniques other than machine learning. In particular, predictions can be more accurate or require fewer computing resources using techniques other than machine learning techniques. As shown in FIG. 2, the process 200 can include switching logic 260 that can be used with respect to training data that is to be used to provide a processing resource sequence prediction. If a machine learning technique 228 is to be used, the process described above can be carried out. If a non-machine learning technique is to be used instead of, or in place of, a machine learning technique 228, the switching logic 260 can provide preprocessed training data to a transition probability analysis technique 264 to provide a transition probability model 268. Transition probabilities can be modelled in a variety of ways, including using a Markov transition probability (Markov chain).

Figure 3:
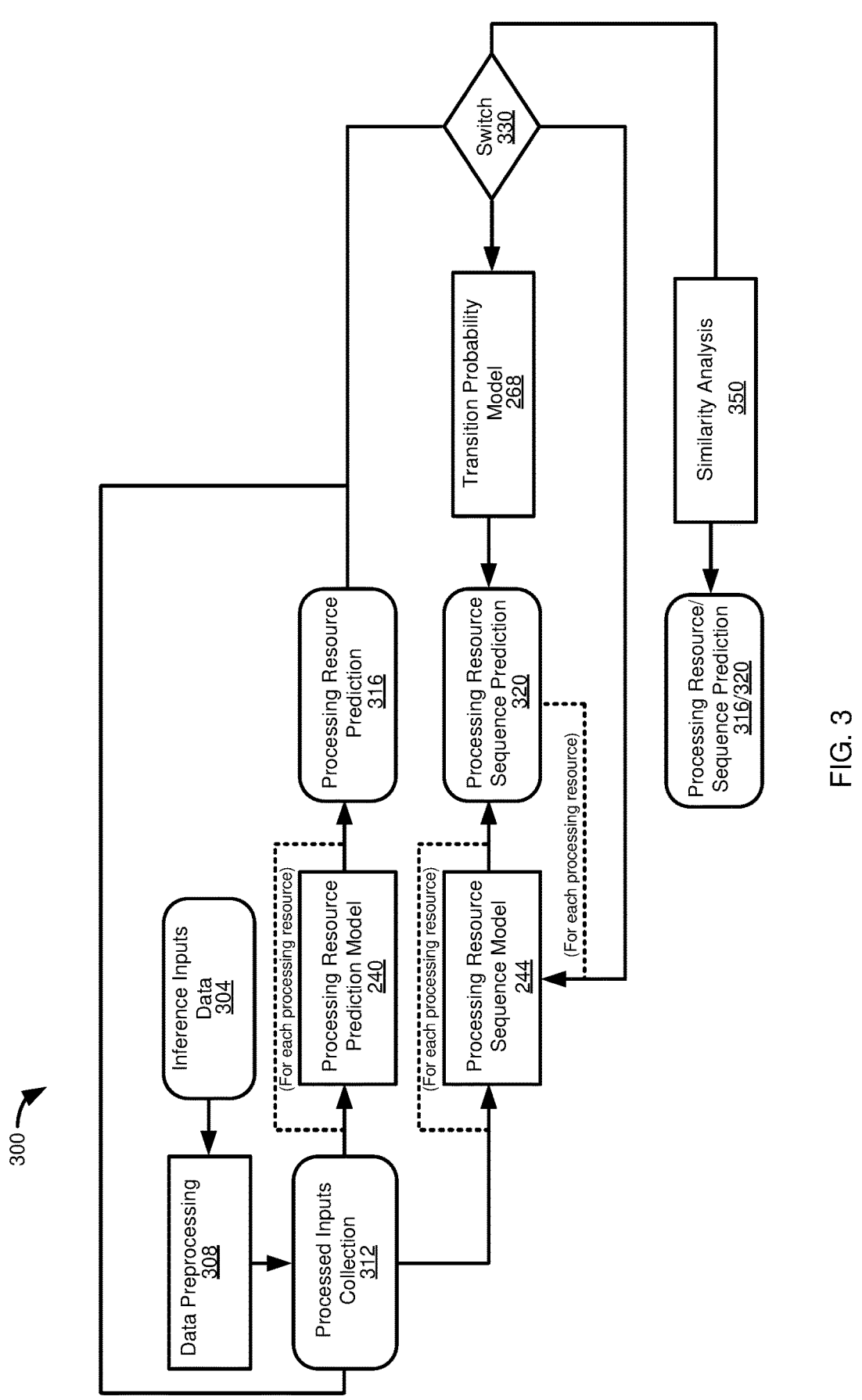
FIG. 3 is a flowchart of a process for obtaining a prediction of processing resources or processing resource sequence information for a set of inference data for a routing process.

FIG. 3 illustrates a flowchart for a process 300 that can be carried out to obtain predictions using models developed using the process 200 of FIG. 2. Inference inputs data 304, such as a set of inputs (for example, a purchase order or bill of materials for which all or a portion of predicted routing operations are desired) are preprocessed at 308. The data preprocessing at 308 can be analogous to the data preprocessing operations at 212 of FIG. 2. The preprocessing at 308 provides a processed inputs collection 312 that is processed using the processing resource prediction model 240 to provide a processing resource prediction 316.

In some cases, as described with respect to FIG. 2, processing resource prediction models 240 can be maintained for each of multiple processing resources. The processed input collection 312 can be submitted to multiple processing resource prediction models 240 to provide multiple processing resource predictions 316. In this case, a processing resource prediction can indicate whether a processing resource is predicted to be used with the input collection, or a likelihood that a given processing resource is used, where these values can be associated with confidence values. Stated another way, the processing resource predictions 316 can be binary yes/no values or can be probabilities that a given processing resource will be used. A single processing resource prediction 316 that provides an overall result (that can include multiple processing resources in a single output of a processing resource prediction model) can be structured in a similar manner—where processing resources are either not included in a prediction 316 or are included with probability values (and where the overall result or individual components can be provided with confidence values).

As described with respect to FIG. 2, inference data can also be used to provide a predicted sequence in which multiple processing resources may be used for the inference data. FIG. 3 illustrates how the models in FIG. 2 can be used to provide a sequence prediction for inference data.

In one implementation, the processed input collection 312 is provided to the processing resource sequence model 244 of FIG. 2 to provide a processing resource sequence prediction 320. In some cases, the models 244 are provided for each processing resource to be evaluated, and thus multiple processing resource sequence predictions 320 can be provided. That is, the output of model 244 can be a sequence position for a given processing resource. In other cases, instead of the model 244, the process 300 can use a model that provides a prediction of both whether a processing resource will be used and a sequence prediction for that processing resource. The prediction can be an overall prediction of processing resources and sequence prediction or, when individual processing resource models are used, the model may have multiple outputs, for different processing resources, indicating whether that processing resource is predicted to be used and a predicted sequence position.

In an alternative implementation, the processing resource prediction, or predictions, 316 can be used as input for the processing resource sequence model or models 244. That is, rather than just the inference inputs data 304 alone, the model or models 244 can operate on both the inference inputs data 304 and processing resources that have been predicted to be used as part of the prediction 316. Otherwise, a processing resource sequence model 244 can be used as explained above when starting from only the inference inputs data 304. For example, when processing resource sequence models 244 are provided for individual processing resources, sequence predictions 320 can be obtained on a processing resource by processing resource basis.

In yet another embodiment, a processing resource prediction 316 is analyzed using the transition probability model 268 to provide the processing resource sequence prediction 320. Processing using the transition probability model 268 can account for processing resources in the prediction 316. That is, transitions to and from processing resources that are not included in the prediction 316 can be ignored.

Optionally, the process 300 can include switching logic 330. The switching logic 330 can be used to determine whether one or both of the processing resource prediction model 344 or the transition probability model 268 are used. The switching logic 330 can use a manual specification of what models to use (or a selection by a process that initiated a prediction request) or can make a selection based on various criteria, such as a confidence level associated with a processing resource prediction 316.

As another option, rather than using a predictive model, a processing resources prediction 316 or a processing resource sequence prediction 320 can be obtained using a similarity analysis 350, including using the switching logic 330. In a particular example, suitable input data (such as would be used with a machine learning algorithm) can be converted to a vectorized format and compared with training data instance in order to identify one or more training data instances that are most similar to the inference data. The processing resources/sequencing of those training data instances can serve as the predictions 316/320.

Example 4—Example Use of Input of Characteristics

Figure 4A:
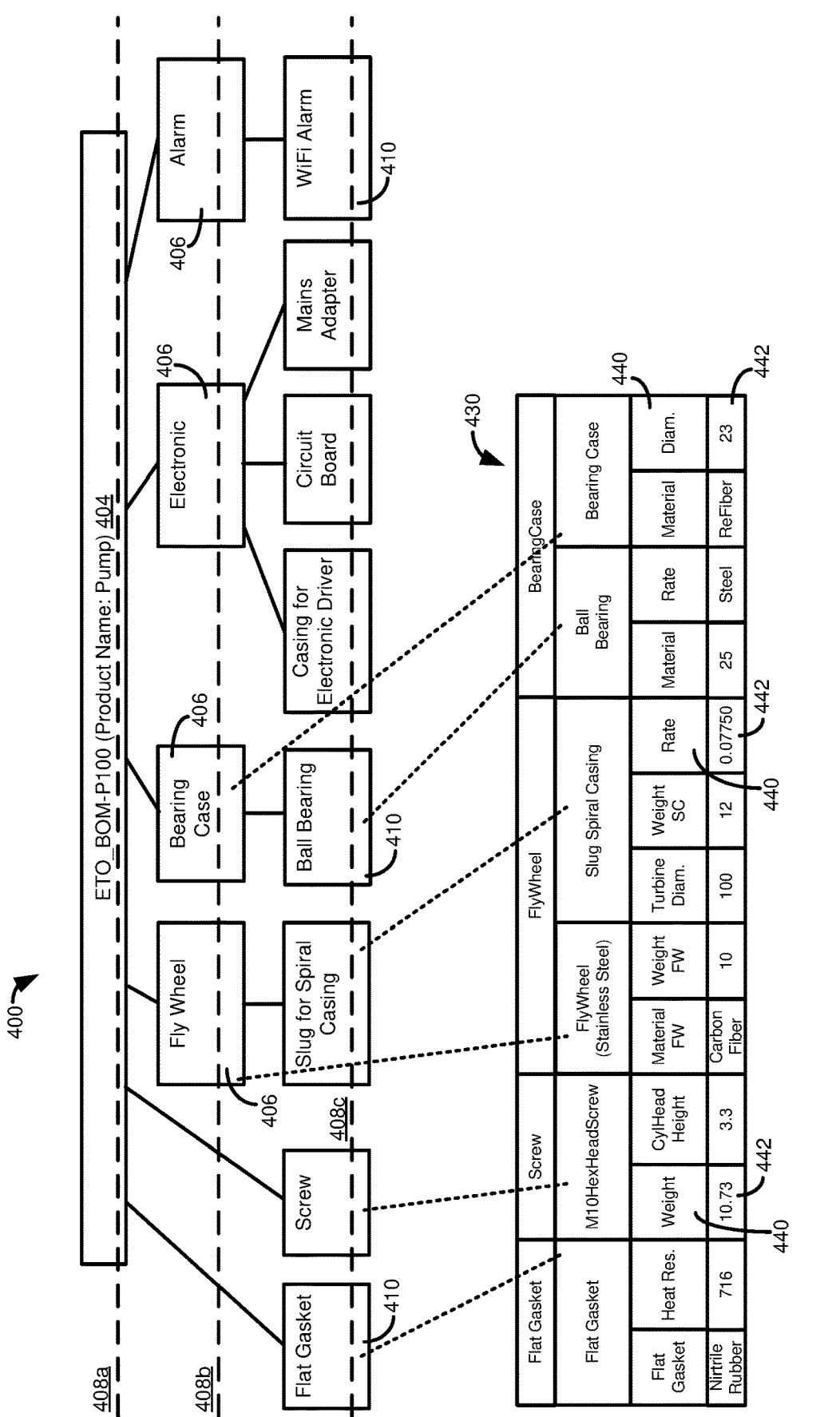
FIGS. 4A and 4B illustrate how a hierarchy of inputs can be related in a hierarchical manner and can be associated with characteristics information.
Figure 4B:
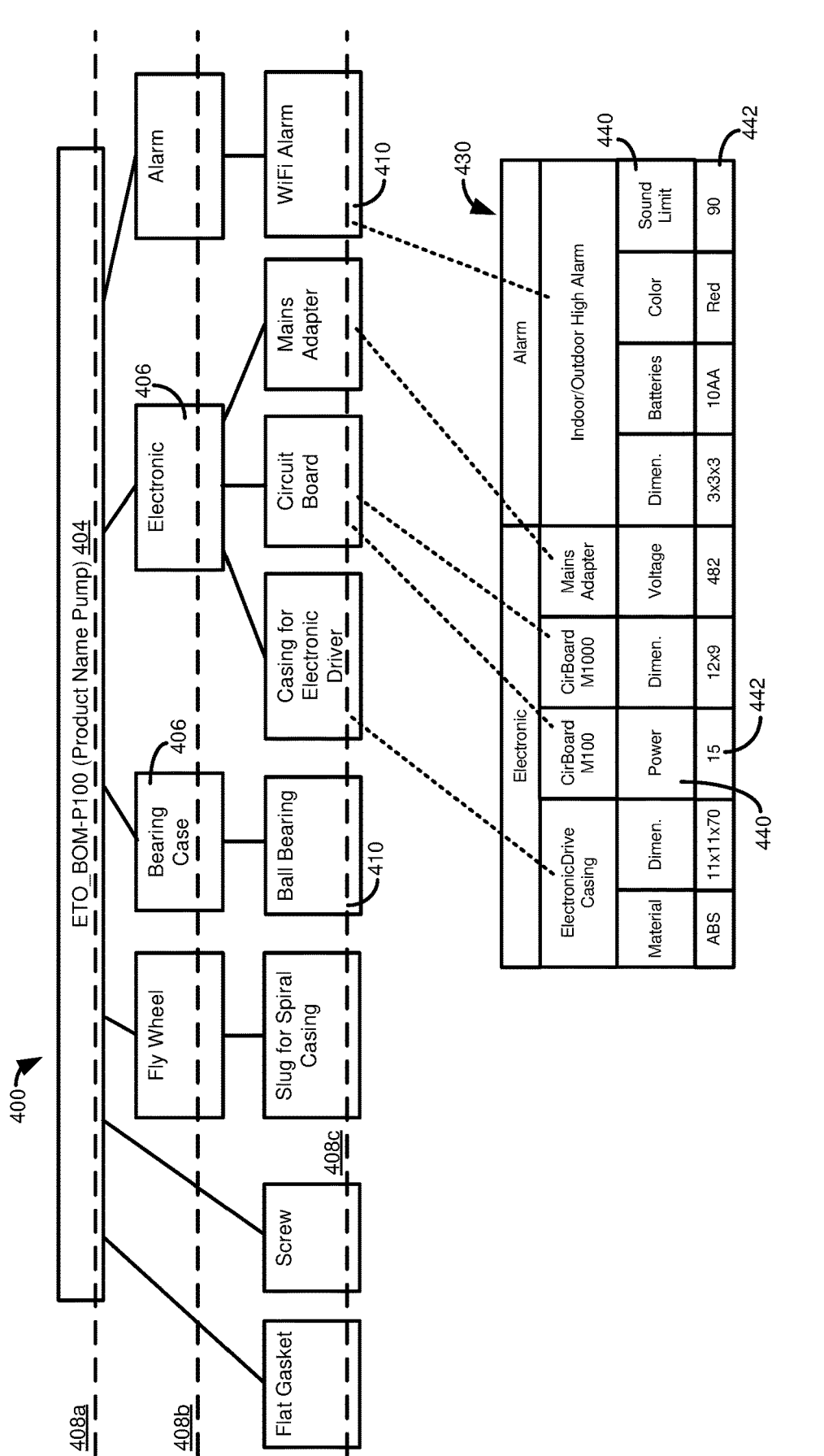

FIGS. 4A and 4B illustrate a hierarchy 400, in the form of a bill of materials, that includes information about how an output 404 is provided from intermediate inputs 406 and different levels 408 (shown as levels 408a-408d) of the hierarchy. Intermediate inputs 406, or the output 404, are in turn associated with particular base inputs 410 at a base level 408d of the hierarchy. Note that base inputs 410 can be associated with any higher level 408 in the hierarchy, not simply the immediately preceding level 408c. As shown, the base inputs 408 are referenced by intermediate inputs 406 at levels 408b and 408c, but are also directly referenced by the output 404.

A tabular representation 430 of the hierarchy 400 illustrates how the intermediate inputs 406 are related to the base inputs 410, and particular attributes or characteristics 440 of the base inputs, where individual input collections (rows of the table 430) have specific values 442 for at least a portion of the characteristics 440.

The characteristics 440 included in the table 430 are generally those that may affect components of a routing, and therefore can be used for both model training and in obtaining a prediction. Although the table 430 is based on the hierarchy 400, input characteristics can be useful for model training and predictions for inputs that are not arranged hierarchically. For the purposes of using characteristics 440 with prediction of processing resources or processing resource sequencing, the characteristics, then, can include those that might affect whether one processing resource or another should be selected.

As a more concrete example, consider a routing where the output 404 is a pump. Assume that a first component is to be joined with a second component, and that an operation to accomplish this is to conduct a drilling operation on the first component. The material from which the first component is formed can affect the drilling operation in a number of ways. If the first component is comparatively soft, a first work center could be used that has a machine that is capable of drilling through softer materials but not hard materials. Accordingly, if the first material is comparatively hard, a second work center could be used that has a machine that is capable of drilling through harder materials.

So, using a hardness characteristic 440 of the first component, it can be determined that the second work center should be used. In the case of a softer material, both work centers could be used, but training data may indicate that the first work center should be selected rather than the second work center. This property of the training data can reflect, for example, that prior routings, such as manually created routings, tried to use the first work center, when possible, perhaps because the second work center is associated with higher costs or processing time, or a desire to preserve availability of the second work center for components that are not capable of being processed by the first work center.

Note that the table 430 can include characteristics 440 that are not used in obtaining a prediction, or which do not contribute to a prediction (or which do not meaningfully contribute, such as in a way that would outweigh the predictive power of one or more other characteristics). In some cases, these characteristics 440 can be ignored or removed in model training or in obtaining a prediction, such as part of the data preparation that occurs at 220 of FIG. 2.

In other cases, once characteristics 440 are identified that have sufficient predictive power, a table 430 can be generated that only includes such characteristics.

FIGS. 4C and 4D also illustrate the table 430, where the table as illustrated in these figures includes a greater number of input collections (rows), to illustrate how values 442 can vary across input collections.

The present disclosure provides a number of ways that characteristics of inputs can be used, as generally illustrated in the process 100 of FIG. 1 (and in analogous operations in developing models used in the process of FIG. 1). That is, input collection information can be at least part of training and inference data for predicting processing resources, processing resource sequencing, operations, operations sequencing, allocation of inputs to operations/processing resources, or determining standard values for operations. In some cases, the values 442 are provided with other identifiers of a given input—such as a class, general type, or specific component identifier (e.g., a model number). In some cases, classes can be defined based on particular types of characteristics 440, or particular values 442 of characteristics. For example, a type can be defined that has properties of material and heat resistance, where all inputs having these characteristics can be assigned to the type. Or, all inputs having particular values, values in a specific set of values, or values within a specified range can be included in a particular type. As with other ways of identifying or grouping inputs, the values 442 can also be used with the type groupings, or the type groupings can be used without the values. In least some cases (such as when processing resources, operations, or sequencing information is being determined), the values 442 can be used without being linked to particular inputs.

Although characteristics have been described as useful for grouping inputs, or for use in a machine learning process, characteristics can be used for other elements of a routing, such as processing resources or operations. For instance, in a production process, work centers may be associated with particular locations, such as a particular plant or manufacturing facility. A work center may be given an identifier such that it is useful to compare routings involving that particular work center, but it may be difficult to compare that work center with other work centers, such as those associated with different facilities.

However, different work centers may have characteristics that overlap to varying degrees. Two work centers, at different facilities, may be used to perform the same or similar operations, or may have the same or similar machinery. Accordingly, classifying or grouping processing resources by characteristics can allow processing resources that have different identifiers to be compared, or pooled for use in training data. That is, for example, if work center 1 at facility 1 has similar characteristics as work center 2 at facility 2, both work centers can be used in a pool of training data by using characteristics of the work center (such as instead of simply using work center identifiers). An increased volume of training data may allow for machine learning techniques to be applied where otherwise a pool of training data may be insufficient, or can increase the accuracy of inference results.

Figure 5:
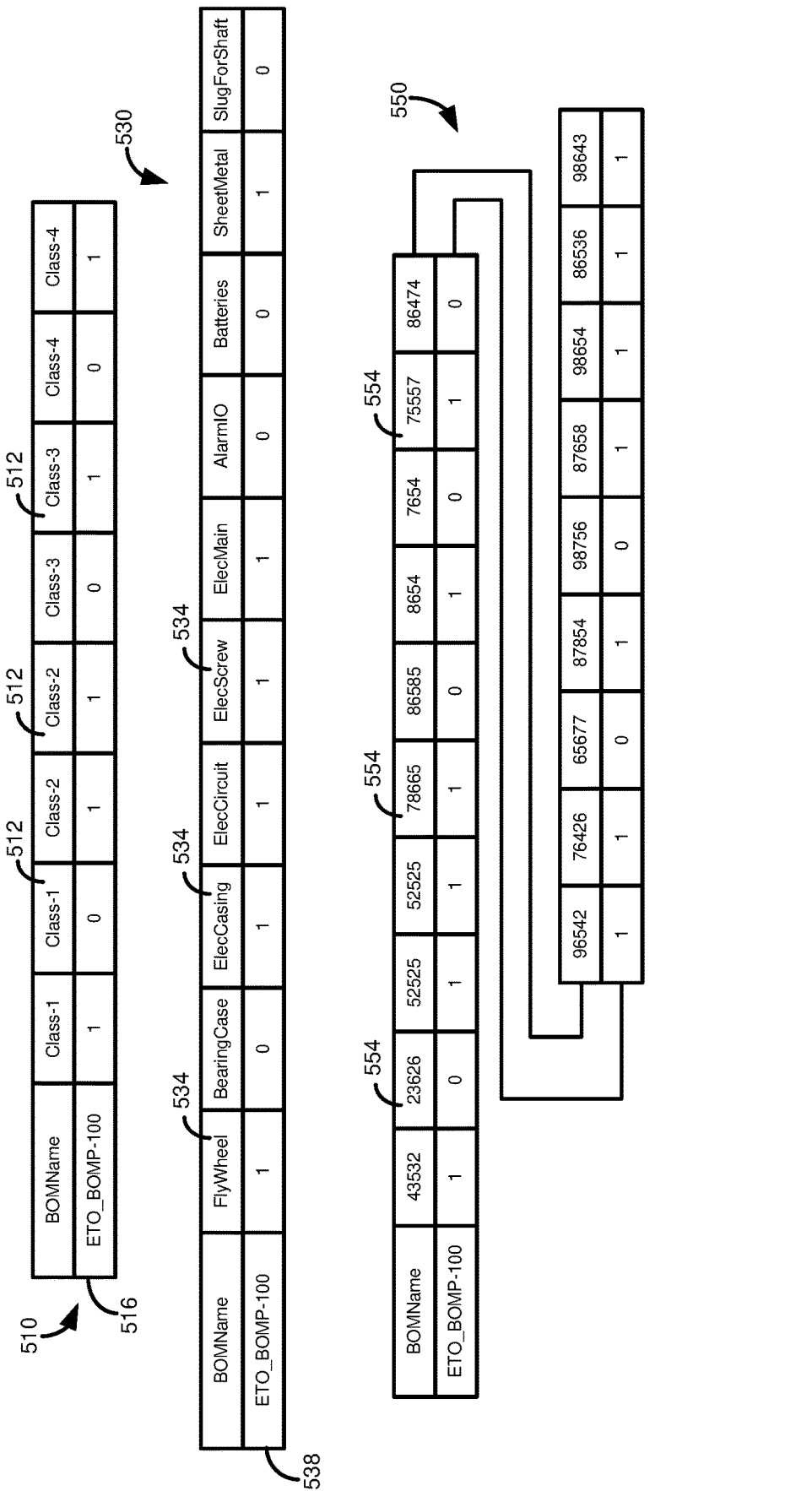
FIG. 5 illustrates various ways of encoding inputs present in a set of training or inference data.

Example 5—Example Expression of Inputs Information at Different Levels of Granularity FIG. 5 illustrates tables 510, 530, 550 that provide alternative ways of encoding the information in the table 430 and the hierarchy 400. The different encodings can reflect different granularities or groupings of intermediate inputs 406 or of base inputs 410. Different encoding granularities can provide options suitable for different use cases or can provide different prediction results, some of which may be more or less accurate than others.

One consideration with respect to different encoding granularities, or encoding schemas more generally, is that an encoding granularity can affect the amount of training data that may be used for model generation. The table 510 can represent a scenario where intermediate inputs 406 and base inputs 410 have been assigned to classifications or groups 512. The classification 512 can be assigned manually or based on a similarity analysis. In some cases, a similarly analysis can consider, for example, characteristics 440 of inputs. In other cases, a similarity analysis can consider other information, in place of, or in addition to, characteristics 440, such as assignment of inputs 406, 408 to particular processing resources or processing resource operations.

Table 510, then, indicates, for a particular set of inputs 516 (for example, a particular bill of materials present in training data or inference data, forming a row of the table) whether an element of a particular class 512 (forming columns of the table 510) is present (using 1 for present and 0 for absence). The set of inputs 516 thus is in the form of a bit vector indicating presents or absence of class elements, and can be used to train a prediction model or to obtain a prediction.

Tables 530 and 550 are generally similar to the table 510, but the columns are defined in a somewhat different manner, using a different granularity for an input. Rather than generic classes, the table 530 uses types or categories 534 for inputs, but does not consider characteristics 440. As an example, as long as a component has a particular name (or similar value) it can be marked as present (or absent) for a given set of inputs 538 (forming a row of the table). Thus, for example, two instances of input data that include a "bearing case" as an input can have their respective table entries set to "1," even if the bearing cases had different characteristics 440 (and, in at least some cases, even if the bearing cases were used in different intermediate components 406 or in producing a different output 408). Depending on how the classes 512 of the table 510 were defined, however, the classes 512 may be broader than the types/categories of table 530 (for example, a bearing case and some other case may be assigned to a class 512 that includes "cases").

Table 550 represents a more granular approach than tables 510, 530, where specific component identifiers 554 are used (as columns) to measure the presence or absence of an input. In this case, individual characteristics 440 are not used in model training or inference predictions, but an input must be at least assigned the same component identifier for the table 550 to indicate its presence (using a value of "1"). Some variability can remain when using the component identifiers 554, as the same component identifier may be used for a component even though the components in the training (or inference data) can have differences, such as being obtained from different manufacturers or having at least some different characteristics 440. For instance, the thickness of a bearing case may be modified over time, as long as within acceptable parameters, but the same component identifier may be used for the bearing case despite such differences.

Figure 6:
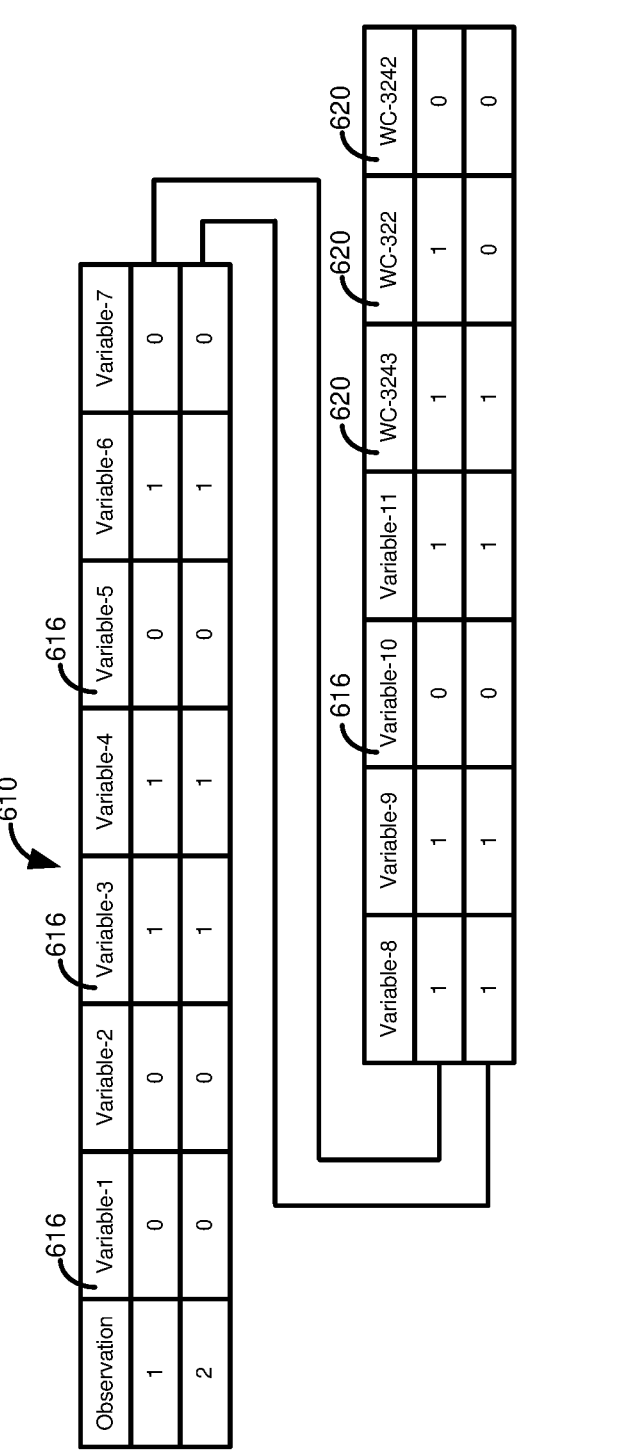
FIG. 6 illustrates how inputs or input characteristics can be associated with processing resource information.

FIG. 6 provides a table 610 illustrating how inputs information encoded as in FIG. 5 can be labelled with information about processing resources used in training data instances. A row of the table 610 can also illustrate a format for an inference provided using a predictive model.

The table 610 includes columns 616 associated with individual variables, where the variables represent an encoding unit for inputs, including as described with respect to FIG. 5. That is, a value of "1" or "0" represents, respectively, the presence or absence of the variable/input in the training or inference data. The table 610 also includes columns 620 indicating whether a particular processing resource (in this example, a work center) was used in training data, or is predicted to be used given particular inference inputs data (the columns 616).

The encodings of FIGS. 5 and 6 do not explicitly capture the hierarchical structure of the hierarchy 400. That is, for example, the table 530 includes information about an "electronic" intermediate input 406 that has child inputs of a "casing for electronic driver," two "circuit boards" and a "mains adapter." If data is encoded at the level of the "electronic" intermediate input 406, then the child intermediate information is not explicitly in the table 530. Similarly, the data in encoded at the level of child components, their relationship the common intermediate input 406 "electronic" is not explicitly captured. To the extent training/ inference data is all encoded in the same way, contributions form hierarchical relationships may be implicitly accounted for in a trained model, for example. However, differently encoded data may not be useable, or similarities and differences between hierarchies may not be useable in training a model or obtaining an inference. Similarly, the encoding of FIGS. 5 and 6 do not reflect a quantity of an input. Example 6 describes how input quantity and hierarchical features can be encoded.

Example 6—Example Encoding of Input Quantity Data and Hierarchal Features

The processes 200 and 300, and other processes and techniques described herein, both can involve data preprocessing to "flatten" hierarchical inputs data, and encode hierarchy information within such flattened representation. FIGS. 7A and 7B present an alternate encoding schema that encodes hierarchy information and input quantity. In order to help with a comparison to the encoding schemas of FIGS. 5 and 6, FIGS. 7A and 7B also use the hierarchy 400 of FIG. 4.

FIG. 7A includes a table 704 that is similar to the table 550 of FIG. 5, in that the table has columns 706 corresponding to particular inputs 406, 410 of the hierarchy 400 and rows representing instances of training data, or inference data, and column values indicate the presence or absence of a respective input.

A table 710 (shown in three sections) correlates names (such as a human understandable description) 712 of inputs with numerical identifiers 714 for the input. The numerical identifiers 714 can be used for a variety of reasons, including because they are easier for a computer to process. In addition, the numerical identifiers 714 can point to specific inputs, of which the name 712 may be a more generic identifier. That is, in the case of an alarm, there may be many inputs in a system that are named "alarm," but the identifier 4363 may refer to a specific alarm (for example, a specific model of alarm from a specific supplier, and possibly even more specific information, such as a batch number or information that may be used to account for variability within a specific model). Or, the identifier 4363 may refer to an alarm type that is more general than a specific model from a specific supplier, but has a more specific meaning than the simple generic description of "alarm."

A table 720 can be generated from the table 704 by including a quantity of a given input 406, 410 using values in an additional row 722. That is, tables 704 and 720 both includes a row 712 identifying particular inputs 406, 410 and a row 714 identifying the presence or absence of a component of the row 712 in a particular instance of training or inference data. A result row 724 of the table 720 is generated by, for inputs 406, 410 indicated as present through the row 714, adding the presence indicator value ("1") to the quantity of the input indicated in the row 722. If desired, the table 720 can directly be used for training and prediction purposes. If desired, the table 720 can be modified to produce a table 740 that captures hierarchy relationships.

The table 740 includes the rows 712, 714, 724, and further includes a row 726 indicating a level in the hierarchy 400 of a respective input 406, 410 and a new result row 728. The result row 728 is generated by multiplying values of the result row 724 by a respective value in the row 726. For example, input 2532, a bearing case, appears at a first level of the hierarchy, and so is multiplied by a factor of 1 to obtain a value of 6 for the result row 728. Input 2942, a slug for a spiral casing, appears at a second level in the hierarchy, and so its value of 9 from the result row 724 is multiplied by the value of 2 in the row 726 to provide a value of 18 in the result row 728. If desired, the table 740 can be used for training or inference purposes without encoding additional information. In addition, if it is not desired to encode input quantity information, the encoding technique used in generating the table 740 can be applied to the table 704 to encode only hierarchy level information.

Turning to FIG. 7B, a table 760 can be generated from the table 740 and encodes input quantity, hierarchy level information, and an indication of whether an input is an intermediate input 406 (a assembly or subassembly, or whether an input is a base input 410 (has no child inputs). The table 760 includes the rows 712, 714, 724, and 728, as well as a row 762 that includes a value indicating whether an input is part of an assembly or subassembly or whether an input is a base input, and a new result row 764. As shown, base inputs are associated with a value of 10, while intermediate inputs are associated with a value of 20. Values in the result row 764 are generated by multiplying a value of the row 728 by a corresponding value in the row 762. In a similar manner as described for the table 740, the encoding used to produce the table 760 can be modified to exclude one or both of hierarchy information or quantity information. For example, the encoding used for the table 760 can be applied to the table 704 or the table 720.

The result row 764, or result rows of the tables 704, 720, 740, can be normalized. For example, a table 780 has a row 782 that is produced by normalizing the result row 764 (that is, dividing the value in each cell of the result row by the sum of all of the values in the result row). Using normalized values can help avoid skew due to large differences in values of various result rows 764, particularly when training data from different types of input collections (such as bill of materials/purchase orders for different product types) are used.

Note that the encoding used for the table 760 tends to accentuate the difference between intermediate inputs 406 and base inputs 410 as compared with hierarchy differences or quantity differences. That is, for example, two sets of inputs where a given input has a level value of 1 in one set and a level value of two in another set, the values of the two sets will differ by a factor of two, but if the same sets differ in that the input in one set is a base input 410 and in the other set it is an intermediate input the values will differ by a factor of 20. In general, when multiple types of information are encoded in a tabular representation of a hierarchy, the weighting can be adjusted as desired, such as to weight hierarchy position or input quantity more than whether an input is an intermediate input or a base input. In some cases, various encoding weights can be empirically evaluated, and a weighting selected that provides a desired result, which can be accomplished as part of a cross validation process. In at least some cases, however, whether an input is intermediate or base can have a greater impact on processing resource prediction than hierarchy position or quantity. For instance, intermediate inputs may be associated with an assembly or installation process that is highly correlated with various processing resources.

Example 7—Example Inputs Data with Processing Resource Sequence Information

Figure 8A:
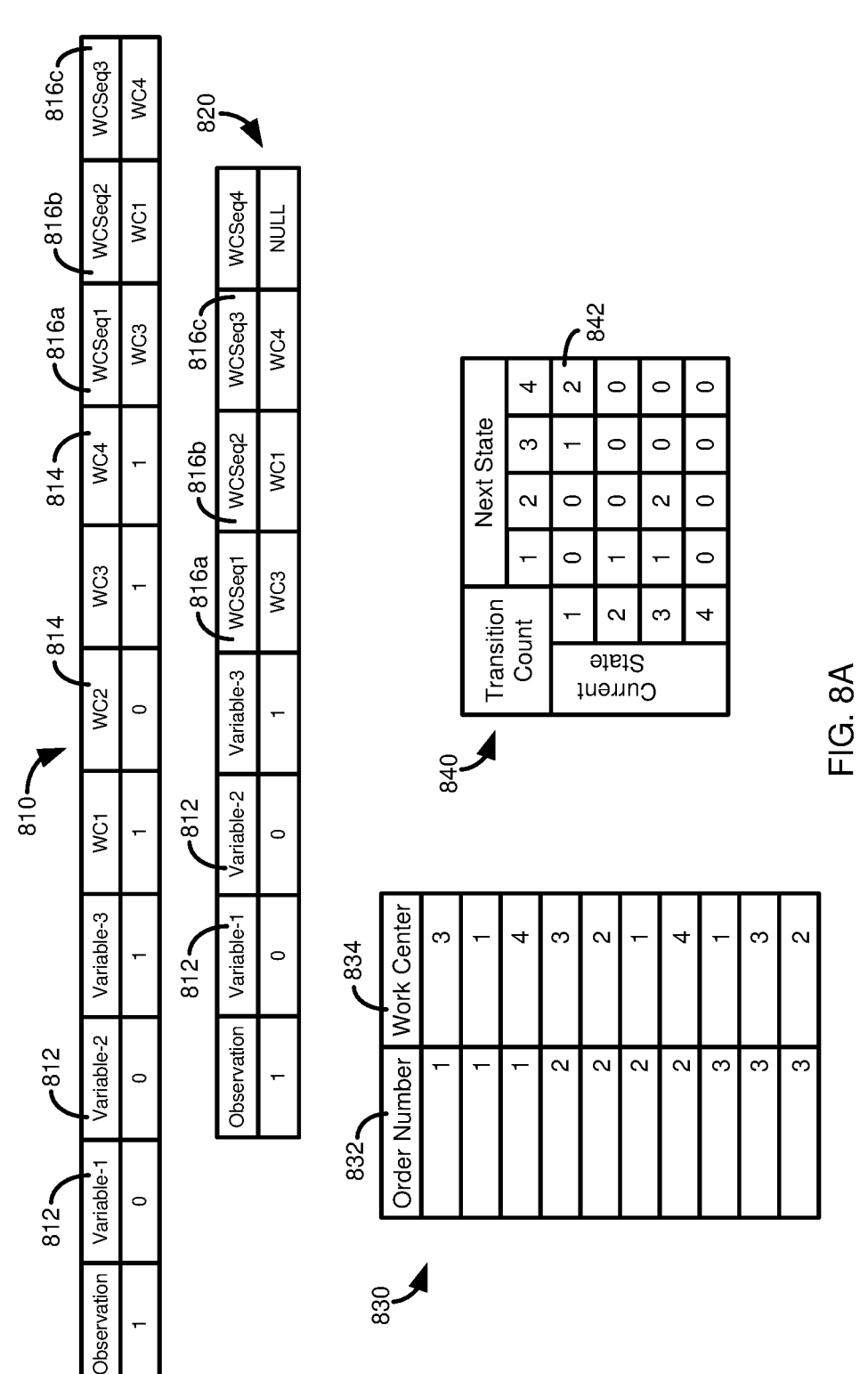
FIG. 8A illustrates how work center sequence information can be represented and used to generate a probability matrix to determine processing resource sequence information for a set of inference data.

FIG. 8A illustrates examples of how a set of inputs can be labelled with processing resource sequence information, and can also represent an example of information that may be presented in a prediction provided in response to inference data. The examples generally are structured as for the table 610 of FIG. 6.

A table 810 includes columns 812 representing various variables (for example, inputs) in a set of training data or inference data. Columns 814 represent processing resources (work centers) in an instance of training data or in an inference result, as described for the table 610. However, as compared with the table 610, the table 810 further includes columns 816 (shown as columns 816a-816c) representing work center sequence information, where column 816a identifies a first work center in a sequence, column 816b identifies a second work center in the sequence, and column 816c indicates a third work center in a sequence. The number of columns 816 can correspond to a number of processing centers that are actually used in a training data instance or are predicted to be used in an inference result. In another implementation, the number of columns 816 can correspond to a total number of possible processing resources, where if less than all of the available processing resources are used, columns corresponding to unused processing resources can be left blank, filled with NULL values, or otherwise indicated as being unused.

A table 820 is generally similar to the table 810, but omits the columns 814, and its columns 816 correspond to the scenario above where the number of columns 816 in the table correspond to the total number of available processing resources and columns 816 that are not needed, because less than all of the processing resources are used, or are filled with NULL values.

The table 810 can represent an implementation where training data includes both processing resource use information and processing resource sequence information, whether that information is used by a model that provides use and sequence information or by separate models providing such information. The table 820 can represent an implementation where a prediction of processing resources used in a routing is obtained separately from a prediction of processing resource sequence.

FIG. 8A also illustrates how the tables 810, 820 can be used to develop a transition probability model, such as the transition probability model 268 of FIG. 2. A table 830 summarizes processing resources (work centers) used in various training data instances (order instances for a particular production order/bill of materials). The table 832 includes a column 832 that indicates a particular training data instance and a column 834 that indicates a particular processing resource used with an associated training data instance, where the processing resources occur in the table 830 in an order (sequence) in which the processing resources were used with the training data instance.

A table 840 represents a transition probability matrix that can be generated from the table 830 (or directly from the tables 810, 820). The table 830 is processed and a value associated with a given transition (cell of the table 840) is incremented by one whenever that transition is encountered in the table 830. Just taking the first row 842 of the table 800, the data indicates that a transition from processing resource 1 to processing resource 1 or processing resource 2 was not observed, and that the transition from processing resource 1 to processing resource 4 was observed twice as often as the transition from processing resource 1 to processing resource 3. Thus, for inference data, if processing resource 1 is predicted to be used in a set of inference data, and processing resource 3 and processing resource 4 are also indicated as used, the table 840 can be used to predict that processing resource 4 is likely the next processing resource in the processing resource sequence for the inference data. In the case where only processing resource 3 or processing resource 4 is used with the inference data, the table 840 can be used to indicate a transition from processing resource 1 to processing resource 3 or processing resource 4.

A proposed processing sequence can be revised to account for transitions that are not present in the transition probability model or for conflicting probabilities. In the case of transitions that are not present, assume a sequence of processing resource is identified, but that a sequence is at processing resource 4 and that processing resource 3 remains to be sequenced. The table 840 indicates that processing resource 4 can be reached from other processing resources, but that processing resource 4 was not observed in the training data as transitioning to other processing resources. The lack of an observed transition may cause a search algorithm to backtrack along the proposed sequence to try and obtain a sequence of observed transitions, even if some individual transitions were less likely than transitions in the "failed" path. Similarly, a first path that may have a first transition with a higher probability than a second transition as a first step in the path. However, it could be that a path having the second transition would have a later transition with a higher probability than a later transition in the path with the first transition. Accordingly, a search algorithm can search multiple paths and provide as a prediction a path with a highest overall probability, or can provide a set of results, which can be ranked, including by their overall probability.

FIG. 8B shows a table 850 that represents another example of how training data can include processing resource sequence information, which can be used for machine learning techniques or in developing a probability-based model. The table 850 also provides operation sequence information, which can be used in obtaining operation sequence predictions in a similar manner as processing resource sequence positions.

The table 850 includes a column 852 that indicates a particular observation for data in a given row, where an observation can be a particular order instance or routing. In the table 850, a separate row is provided for each operation performed on a particular input. An identifier of the input is provided in a column 854. A column 856 can be used to indicate a particular location at which the operation occurs, such as a particular plant, distribution center, or other facility. A given facility may have multiple processing resources (or work centers).

A column 856 identifies a particular operation by an identifier, while a semantic description of the operation is provided in column 860. A processing resource where the operation performed is identified in column 862, and an order in which the operation occurs is identified in column 864. Note that the operation order may be for an overall process, rather than being specific for a specific input. That is, for example, if multiple inputs are used in the same operation, they can have the same operation order. Or, even though an operation might be a first operation that uses a particular input, it may not be the first operation in an overall operation sequence having earlier operations that do not use that input.

If desired, sequence information can be extracted from the table 850, such as shown in the table 870. The table 870 contains a column 872 for a particular observation, and columns 874 that correspond to particular ordering in which processing resources are used for an observation. Note that a given processing resource can be used multiple times in a given process, either sequentially or after processing at another processing resource. In particular, the information in the table 870 can be used to generate a transition matrix, analogous to the transition matrix 840 of FIG. 8A.

Figure 9:
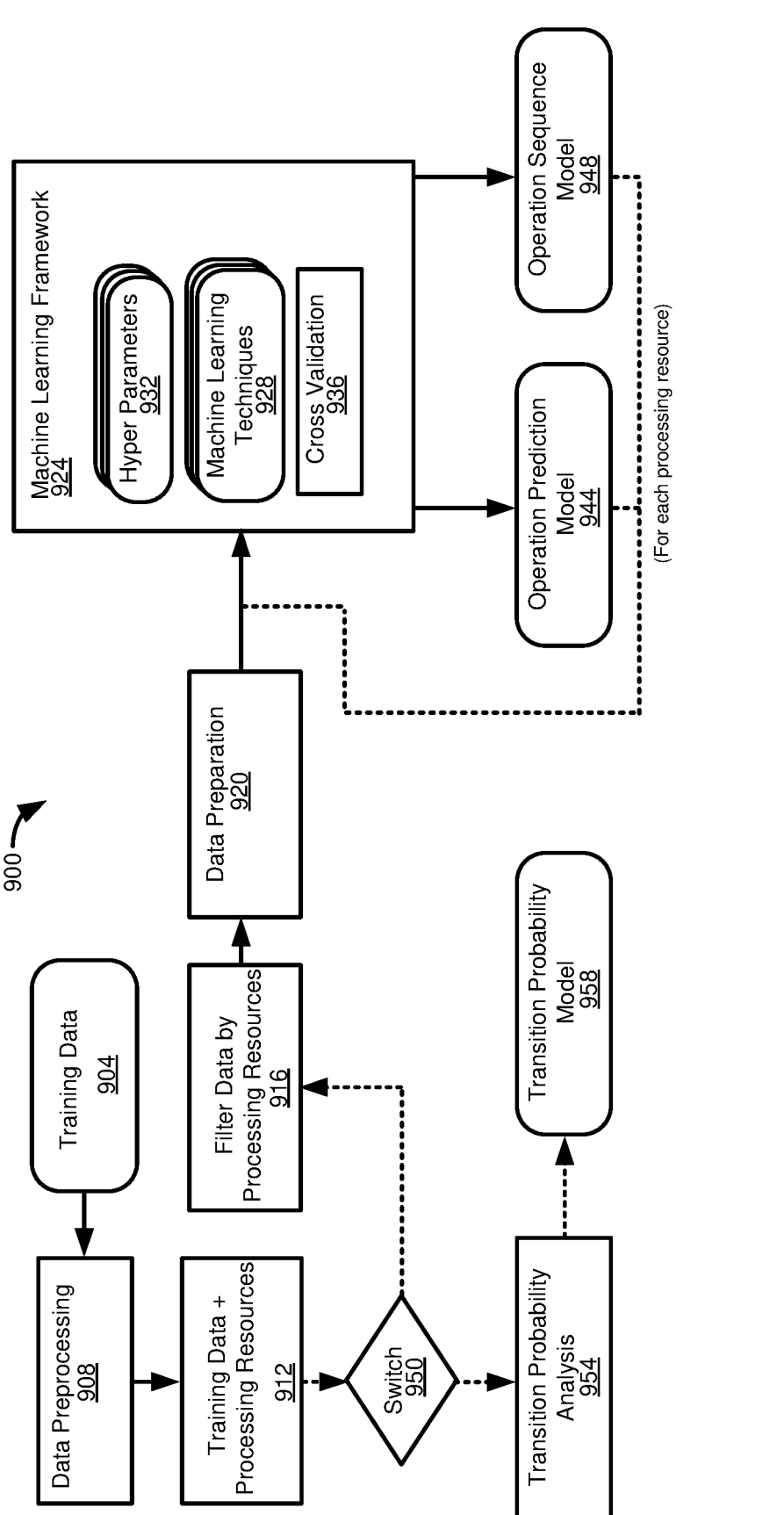
FIG. 9 is a flowchart of a process for generating models for predicting operations or operation sequence information.

Example 8—Example Model Training and Use for Operation or Operation Sequence Prediction FIG. 9 illustrates a process 900 that can be used to train one or more models for use in predicting operations in a routing scenario, such as given a set of inputs and optionally other data. The process 900 provides training data 904 for a preprocessing step 908. The training data 904 includes inputs used in the particular training data instance and operations associated with that instance. Optionally, the training data 904 can also include, or can later be combined with, information about processing resources used in the training data instance, or can have operations data correlated with particular processing resources. Having the training data 904 labelled with information regarding processing resources can be used to provide a prediction that provides both operations and assignments of operations to processing resources. In other cases, a prediction of operating resources can be provided (including along with the inputs inference data) to a separate model that predicts assignments of operations to processing resources.

The training data 904 can also include, or can be later combined with, information regarding a sequence of operations. In some cases, training data 904 is used to develop a prediction model that predicts both operations and operating sequencing. In other cases, training data 904 is used to create separate models for operation prediction and operation sequence prediction where, for example, an inference can be obtained to provide predicted operations and then those predicted operations can be provided to an operation sequence prediction model for an operation sequence prediction.

The data preprocessing at 908 can be carried out as described for the data processing at 212 of the process 200 of FIG. 2. That is, the data processing at 908 can be used to flatten a set of hierarchically arranged inputs, optionally preserving information such as input quantity, hierarchy level, and whether inputs are part of an assembly or subassembly or are "base" inputs.

The data processing at 908 provides processed training data 912 that includes the operations (and optionally processing resource) information. Or, the training data at 904 can provide the inputs data that is processed at 908 and then combined with the operations/processing resource data to provide the processed training data 912. Optionally, operation prediction or sequencing can be carried out for different processing resources, as described for the process 200. Accordingly, the processed training data 912 can be filtered by processing resource at 916.

The processed training data 912, optionally filtered at 916, can undergo a data preparation step 920, which can be at least generally similar to the data preparation step 220.

Prepared data from the data preparation step 920 is provided to a machine learning framework 924, which can be configured as described for the machine learning framework 224, including having the machine learning framework 924 include one or more machine learning techniques 928, one or more hyperparameters 932 useable with at least a portion of the one or more machine learning techniques 928, and a cross validation process 936.

The machine learning framework 924 provides one or more operation prediction models 944 that can be used with inference data to obtain a prediction of operations needed in a routing involving a given set of inputs. When the training data 904 is labelled with operation sequence information, the machine learning framework 924 can be used to provide one or more processing resource operations sequence models 948. When it is desired to obtain models on a per-processing resource basis, models 944, 948 can be prepared for each processing resource by submitting the training data, as filtered at 916, to an appropriate machine learning technique 928. Although not shown in FIG. 9, when training data 904 is labelled with both operations and operations sequence information, a model can be produced that predicts both operations and operations sequencing.

As with the process 200 of FIG. 2, in at least some cases it can be beneficial to use a probability-based model to determine operations sequencing information, rather than using one of the machine learning techniques 928, or to have both types of models available for use. Accordingly, the process 900 can include switching logic 950 that can be used to determine whether the machine learning framework 928 will be used or where the input data undergoes a transition probability analysis at 954 to produce a transition probability model 958. The switching logic 950 can be omitted, and the process 900 can be set to use either the machine learning framework 928 or the translation probability analysis 954, or can be set to produce both types of models.

Probability-based models can also be used to predict operations to be carried out for particular inputs, including for particular work centers. For instance, training data can be analyzed to determine a number of occurrences of a particular operation on a particular input. The number of occurrences for individual operations can be divided by a total number of operations in a set of data to arrive at probabilities of individual operations occurring. In some cases, pathfinding algorithms can be used to maximize an overall probability of a sequence of operations for a given input or set of inputs.

Figure 10:
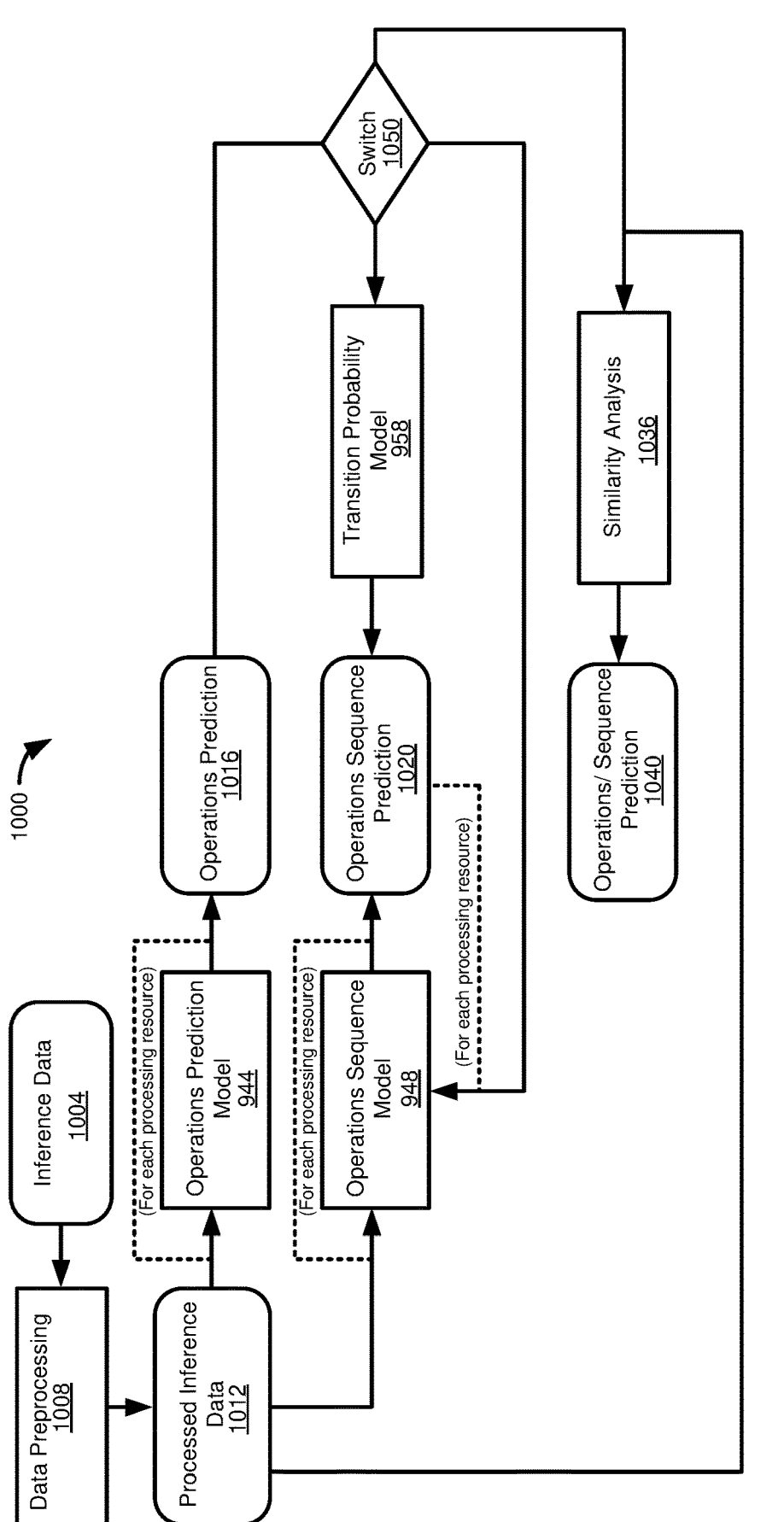
FIG. 10 is a flowchart of a process for obtaining inferred operations or operation sequence information for a set of inference data.

FIG. 10 illustrates a process 1000 that can be used with one or more of the models 944, 948, 958 to provide predicted operations or operations sequencing for a set of inference data. Inference data 1004 is preprocessed at 1008 to provide processed inference data 1012. The processing at 1008 can be analogous to the preprocessing at 908, and the processed inference data 1012 can be similar to the processed training data 912. However, the processed inference data 1012 omits at least one set of labels. That is, when the processed inference data 1012 is to be used to obtain an operations prediction, the processed inference data 1012 does not include operations, but can be labelled with processing resources or processing resource sequence information. When the processed inference data 1012 is to be used to obtain operations sequence information, the processed inference data 1012 can include inputs data, optionally with processing resource or processing resource information, but when an operations sequence is to be predicted, the inputs data of inference data 1012 can be further labelled with operations information, which can be a prediction obtained using the machine learning model or information provided through a manual process or an alternative computer-implemented process.

In one scenario, the processed inference data 1012 is processed using the operations prediction model 944 to provide an operations prediction 1016. In another scenario, the processed inference data 1012 is submitted to the operations sequence model 948 to provide an operations sequence prediction 1020. Optionally, the inference data 1012 submitted to the operations sequence model 948 can be combined with an operations prediction according to the process 1000, such as the operations prediction 1012 or an operations prediction 1040 obtained through a similarity analysis 1036.

As an alternative to using a machine-learning technique, the operations prediction 1012, typically combined at least with inputs data, can be processed using the transition probability model 958 to obtain the operations sequence prediction 1020. In some cases, rather than using a modelling approach, it may be suitable to obtain an operations prediction 1012 or an operations sequence prediction 1020 using a non-model-based approach. For example, suitable inference data 1004 can be used in a similarity analysis process 1036, such as using Jaccard similarity for vectorized inference data, to obtain an operations and/or operations sequence prediction 1040.

Switching logic 1050 can be used to determine whether the operations sequence model 948 or the transition probability model 958 will be used to obtain the operations sequence prediction 1020. The switching logic 1050 can also determine when the similarity analysis 1036 will be performed. Optionally, switching logic can also be used to determine when the similarity analysis 1036 will be used with the processed inference data 1012. As with other processes that have been described, various implementations can have different model or similarity analysis specified, instead of using the switching logic 1050, or output from all prediction techniques can be used.

Example 9—Example Inputs Data with Operations Information

FIG. 11 illustrates a format, in the form of a table 1100, in which training data for an operations prediction, or an operations sequence prediction, can be provided. The table 1100 can also represent a format in which inference results can be provided. In some cases, the table 1100 represents a single training data instance. In other cases, the table 1100 can represent a combination of multiple training data instances. If desired, the table 1100 can be adapted to include information from multiple training data instances, but also to allow data to be correlated with particular training data instances. That is, the table 1100 can be modified to include a column that includes an instance identifier, which can be a purchase or bill of materials identifier, in some cases.

The table 1100 includes a column 1106 that provides a description of an input. The value included in the column 1106 can correspond to a desired method of identifying inputs. That is, as has been described, inputs can be assigned to general classes or types, can be referenced by a name, or can be referenced by a specific input identifier. A table 1100 can optionally include multiple identifiers for a given input, such as including a class, a description, and an input identifier. Including a description can be useful in some cases, such as when nature language analysis techniques are used to identify inputs that can be considered equivalent for modelling purposes, but where the descriptions may vary.

The table 1100 further includes a column 1110 that provides an operation identifier. The operation identifiers can be correlated to specific operations, and the operation identifiers can be associated with operation descriptions that are provided in a column 1118. Operation identifiers 1110 can be useful when multiple operations have the same description but may differ in practice, such as when multiple operations may be called "installation," but the inputs and specific actions carried out in the "installations" may differ. Conversely, operation descriptions 1118 can be useful when it is desired to pool different types of data for training purposes—where operations might be considered sufficiently similar if they have similar operation descriptions, or having similar operation descriptions and also having similar inputs. The table 1100 includes a column 1114 listing a particular processing resource on which an operation is performed.

One issue with the table 1100 is that there can be discrepancies between input descriptions (column 1106) or operation descriptions (column 1118). Data preprocessing at 908 or 1008 (or other techniques that involve input or operation descriptions) can include processing these descriptions to facilitate comparison. For instance, there may be text case differences between two instances of the same operation or input description. Punctuation and certain words in the operation or input descriptions can also be removed, as can non-ASCII characters. Lemmatization or stemming operations can be used to help achieve greater consistency between descriptions, including so that the same operations or inputs in different sets of training data can be reconciled to provide an expanded pool of training data even if the terminology used with the descriptions differs.

Table 1200 of FIG. 12 illustrates example results of performing preprocessing on the table 1100. The table 1200 includes columns 1206, 1222, and 1226 that correspond to columns 1106, 1114, 1118. However, the columns 1206, 1222, 1226 have been converted such the text has been formatted to remove capitalization, providing more standardization between processing resource identifiers or descriptions used for inputs or operations. In addition, the input description of column 1206 has been split into component terms in columns 1210, 1214, 1218. Splitting descriptions into component terms can help facilitate comparing inputs, including to try and classify a new input using, at least in part, input descriptions. Optionally, a similar process can be applied to the operation description of column 1226.

The standardized data in the table 1200 can be used to corelate descriptive terms of a set of inputs with operations using inputs having particular terms. That is, as shown in table 1300 of FIG. 13, columns 1310 correspond to a portion of the input description terms in the columns 1210, 1214, 1218. Feature extraction techniques, such as identifying descriptive terms that are correlated with particular operations, can be used to remove terms that have insufficient predictive power. Otherwise, a column 1310 is provided for each descriptive term, and row of the table 1300 correspond to individual operations in the column 1110 of the table 1100. Values for the columns 1310 in a given row form a bit vector where a cell is given a value of 1 if a term is present and a value of 0 if a term is not present. This encoding allows descriptions to be used in developing a model, and providing inference, since many modeling techniques are not able to operate using string values.

The table 1300 further includes a column 1320, an operation identifier that corresponds to the column 1110 of table 1100, and columns 1330 and 1340 that provide, respectively, identifiers for processing resources associated with an operation and an operation description, corresponding to columns 1114, 1118.

Figure 14:
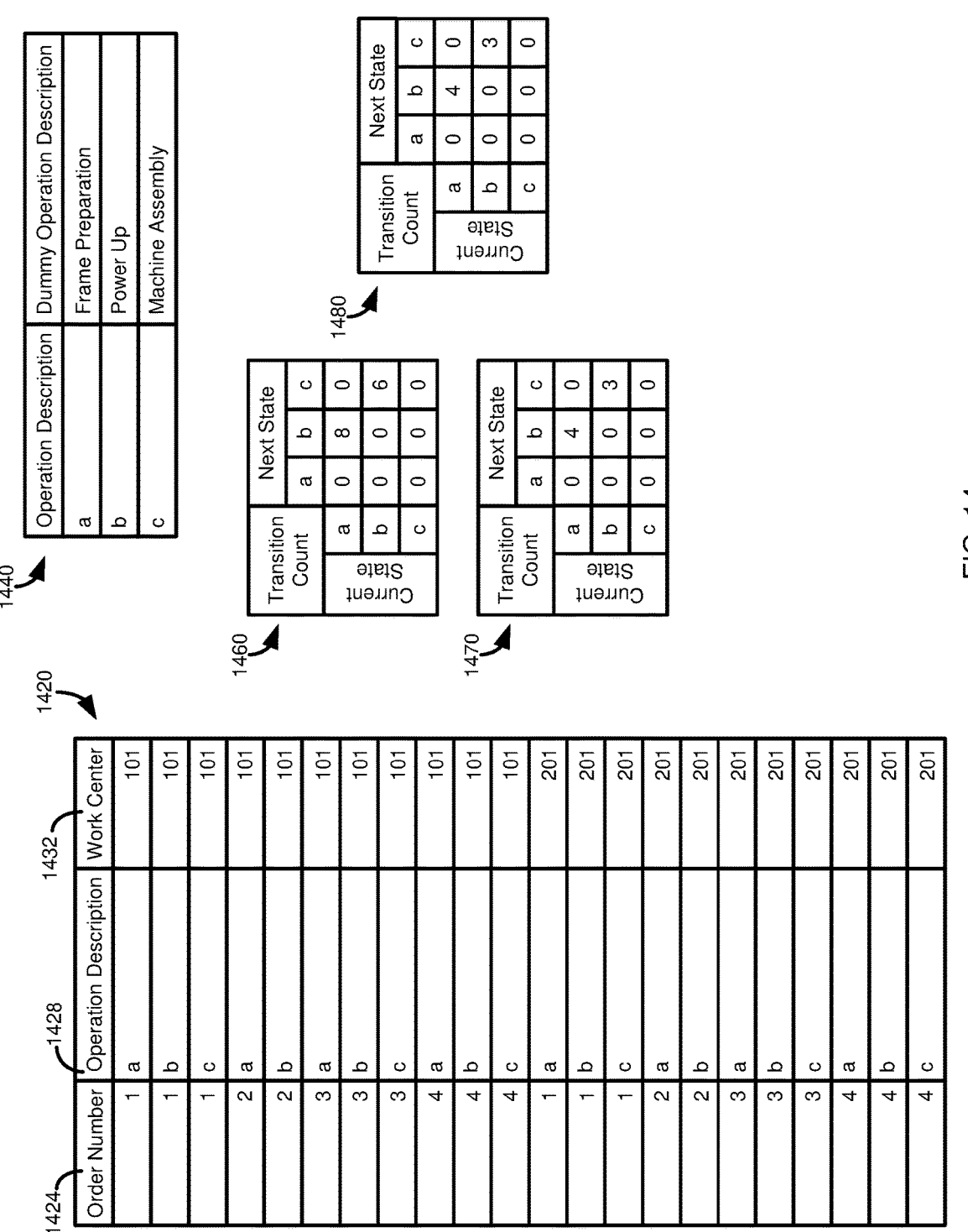
FIG. 14 illustrates how operation sequence information can be used to generate an operation sequence probability matrix.

As discussed with respect to the process 900 of FIG. 9, in some cases it may be desirable to obtain an operations sequence prediction using a transition model, rather than a machine learning model. FIG. 14 illustrates data structures that allow a transition model to be developed and used.

A table 1420 summarizes operations, column 1428, for various training data instances, column 1424, and identifiers, column 1432, for processing resources where the respective operations were performed. The operations of column 1428 are in the form of operation identifiers, which can be correlated to operation descriptions using a table 1440.

The table 1420 can be used, in a similar manner as the table 830 of FIG. 8, to form tables 1460, 1470, 1480 that represents transition matrices. The table 1460 is a transition matrix for the table 1420 considered as a whole, while the tables 1470 and 1480 represent transition matrices for specific processing resources in the table 1420. That is, as has been described, in some cases more accurate operation sequence predictions can be obtained by using inference data where predicted processing resources, more particularly the assignment of particular operations to particular processing resources, are known, and thus transition models can be developed for particular processing resources, rather than considering the processing resources as a collection.

Example 10—Example Training and Use of Model for Inputs Allocation

Figure 15:
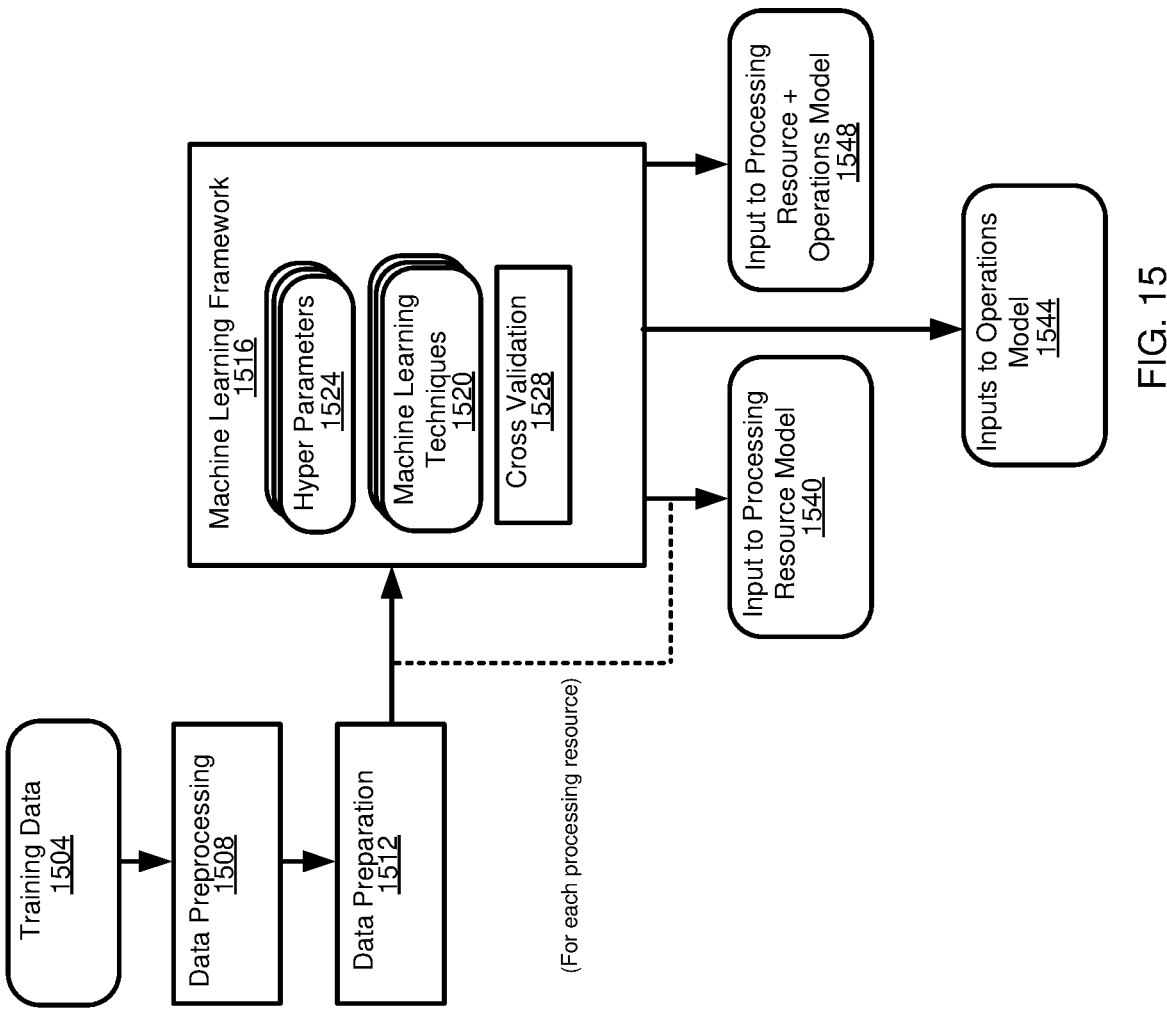
FIG. 15 is a flowchart of a process for generating models usable to infer an allocation of inputs to processing resource or operations.

FIG. 15 illustrates techniques for generating models useable to predict how inputs for a set of inference data should be assigned to particular processing resources, to particular operations, or a combined prediction that predicts assignment to particular operations at particular processing resources. That is, prior techniques have described how processing resource for an inputs set can be predicted, but that prediction does not assign inputs to particular processing resources, where assignment to processing resources, and operations, is needed for a final, completed routing.

Different models can be produced using different types of training data 1504. In one implementation, training data 1504 includes inputs and the allocation of inputs to processing resources. In this implementation, the training data 1504 can be used to produce a model 1540 that predicts how inputs should be assigned to processing resources.

In another implementation, the training data 1504 includes inputs, allocations of inputs to processing resources, and allocation of inputs to particular operations. In this implementation, the training data 1504 can be used to generate a model 1548 useable to predict how inputs should be assigned to particular operations at particular processing resources.

In another implementation, the training data 1504 provides assignment of inputs to operations, but does not consider processing resources associated with operations. In this implementation, the training data 1504 can be used to produce a model 1544 that predicts assignments of inputs to operations, but additional analysis would be needed to predict how operations would be assigned to processing resources.

The training data 1504 can be preprocessed at 1508 and then prepared at 1512 for submission to a machine learning framework 1516. The preprocessing at 1508 and the preparation at 1512 can include operations associated with the corresponding actions in the processes 200 and 900. Similarly, the machine learning framework 1516 can be implemented at least generally as described for the machine learning framework 224 of FIG. 2, including having one or more machine learning techniques 1520, one or more hyperparameters 1524 that can be used with at least one of the one or more machine learning techniques, and a cross validation process 1528.

Inferences from the model 1540 or the model 1544 can be used as input to the model 1548, allowing allocations of inputs to operations to be determined or inputs to processing resource to be determined. Having this overall prediction result from the use of two models can provide more accurate results than using the model 1558 with inference data that only includes inputs data.

Figure 16:
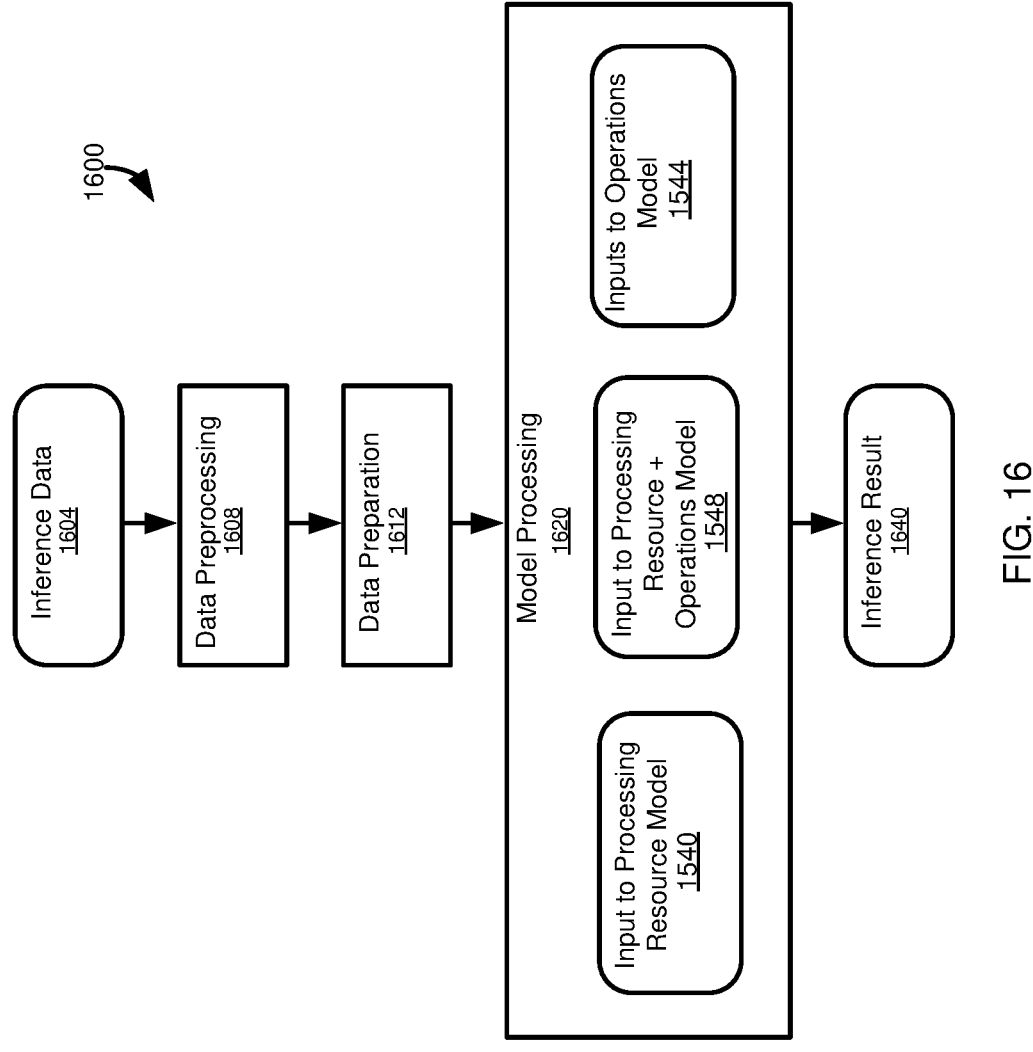
FIG. 16 is a flowchart of a process for obtaining a predicted allocation of inputs to operations or processing resources used in a routing process.

FIG. 16 illustrates a process 1600 of how the models 1540, 1544, 1548 can be used to provide inference results. Inference data 1604 is preprocessed at 1608 and prepared at 1612 in a similar manner as the corresponding training data for a model being used, as in the corresponding operations 1508, 1512 of the process 1500. The processed, prepared inference data is processed at 1620 using an appropriate model 1540, 1544, 1548 to provide an inference result 1640. The inference result 1640 depends on the nature of the model. If the model 1544 is used, the inference result 1640 includes a prediction of how inputs are allocated to operations. If the model 1548 is used, the inference result 1640 includes a prediction of how inputs are assigned to processing resources and operations. If the model 1540 is used, the inference result 1640 includes a prediction of how operations are allocated to processing resources.

Note that different instances of the same component can be assigned to different processing resources or to different operations within a processing resource. For instance, in the example where a vehicle uses six of a particular type of bolt, three bolts might be used for an engine, processed at one processing resource, and three bolts might be used for a drivetrain, processed at another processing resource.

Example 11—Example Model Training and Use for Standard Values Prediction

Figure 17:
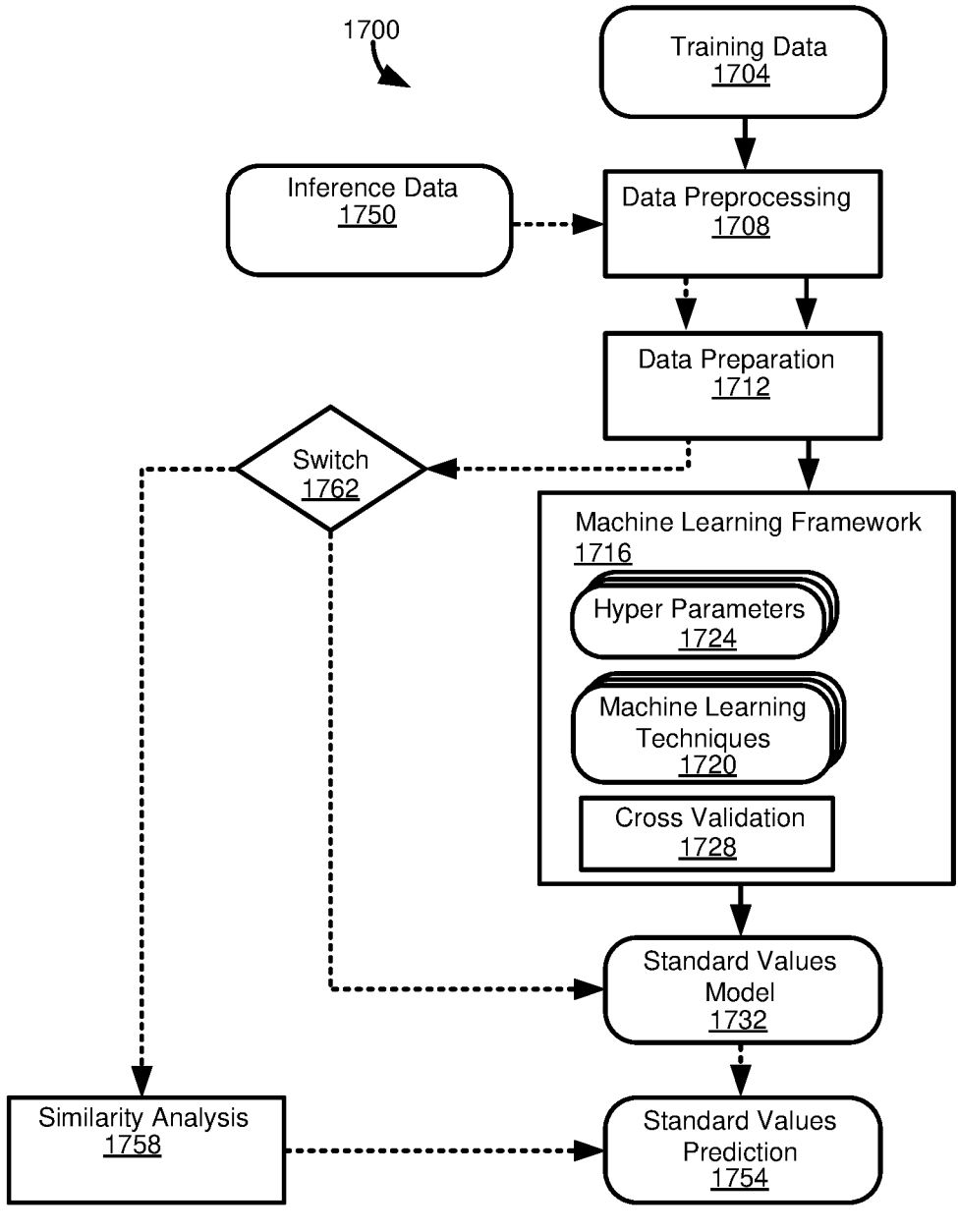
FIG. 17 is a flowchart of a process for generating models useable to estimate standard values for performing operations in a routing process.

FIG. 17 illustrates a process 1700 for developing a prediction model that can be used to predict characteristics for operations in a routing. In the case of a production routing, the characteristics can represent standard values (or benchmarks) for routing operations. For example, a particular operation may be associated with an estimated time to setup a machine for a manufacturing operation, an estimated time the machine will operate once the operation is started, and an estimated amount of operator time in carrying out the operation (which could include, for example, actions such as setting up or closing down the machine or monitoring the process of an operation). These standard values can be used for a variety of purposes, including scheduling activities at processing resources or scheduling various operations in a routing (for example, planning when an activity B should start based at least in part on an estimated time to complete an activity A).

Training data 1704 is preprocessed at 1708. The content of the training data 1704 can vary, but includes information about inputs in a specified operation. The inputs information can be of the various forms that have been described, such as a classification assigned to an input, a general input group or name, a specific input identifier, characteristics/properties of inputs, or a combination thereof. In order to associate the inputs with specific operations, the training data 1704 typically includes an operation identifier, and can optionally include additional information, such as an operation description, which can be provided as a single string or can be broken up, such as into constituent words (or other elements). The training data 1704 can also identify a particular processing resource on which the operation was carried out, as well as one or more standard values. At least some of the contents of the training data can optionally be added after preprocessing at 1708, or after a data preparation process at 1712.

Types of preprocessing operations will be further described, but can generally be operations similar to those described for other types of training data, such as forming a bit vector for a training data instance that indicates the presence or absence of particular inputs. When an operation description is included, the operation description can be converted to a standardized format, or parsed to separate the operation description into particular elements, or to convert an operation description into a numerical representation (e.g., a bit vector that indicates the presence or absence of particular elements in the operation description of a training data instance).

The data preparation at 1712 can be at least generally as described for the data preparation 220 of the process 200. That is, data preparation at 1712 can include identifying and extracting features of the training data to contribute to a prediction to a desired extent or over/undersampling. The preprocessed, prepared data is submitted to a machine learning framework 1716, which can be implemented at least generally as described for the machine learning framework 224 of FIG. 2, including having one or more machine learning techniques 1720, one or more hyperparameters 1724 associated with at least one of the one or more hyperparameters, and a cross validation process 1728. The machine learning framework 1716 produces a standard values model 1732.

The process 1700 also illustrates how an inference result can be obtained. Inference data 1750, having contents of the training data 1704 apart from the standard values labels, is preprocessed in an analogous way as the training data at 1708. At least some of the data preparation operations at 1712 can also be applied to the inference data 1750, such as extracting relevant features (such as inputs or operation description components).

The inference data 1750 (including as preprocessed/prepared) can be processed in one or more ways. In a first way, the inference data 1750 is submitted to the standard values model 1732 to obtain a standard values prediction 1754. In a second way, the inference data 1750 can be used in a similarity analysis at 1758 to provide the standard values prediction 1754. The similarity analysis 1758 can be a Jaccard analysis that compares a vectorized representation of the inference data 1750 to vectorized representations of the training data 1704 to identify instances of the training data 1704 that are most similar to the inference data.

A given process may select to use one or both of the similarity analysis 1758 or the standard values model 1732. In other cases, the process 1700 can include switching logic 1762, where the switching logic can determine, such as based on settings associated with an inference request, analyzing results of the similarity analysis 1758 or the standard values model 1732, or the amount/quality of the training data 1704, whether the similarity analysis 1758 or standard values model 1732 should be used in providing the standard values prediction 1754.

Figure 18A:
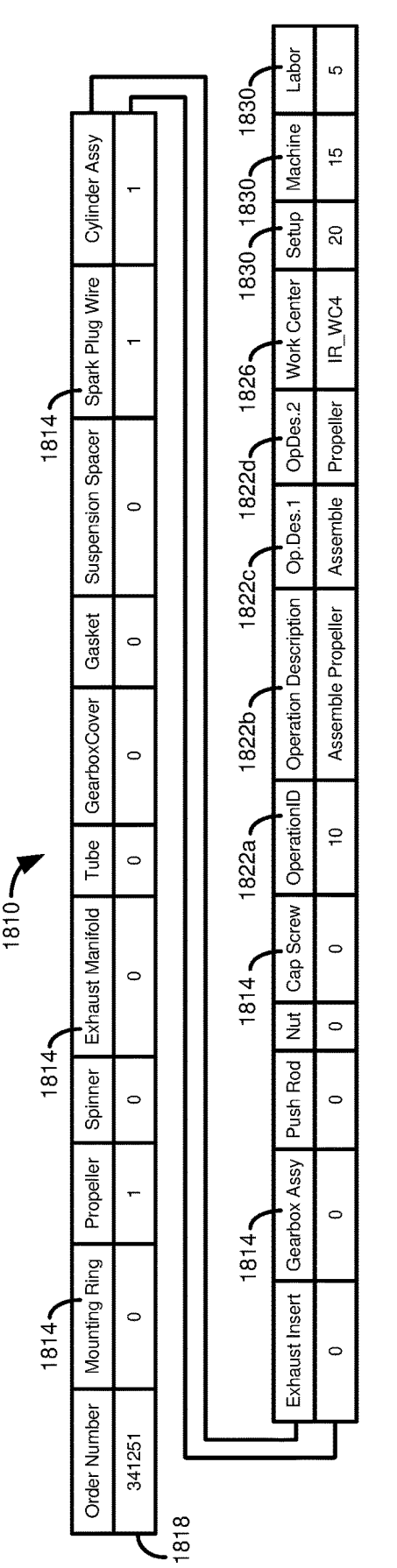
FIG. 18A illustrates how standard values can be associated with an operation for a set of inputs.

Table 1810 of FIG. 18A illustrates a format in which training data for producing a standard values prediction model can be provided, and thus also includes features that can be included in an inference result. The training data itself can be in the form of columns 1814 that provide a bit vector indicating the presence or absence of particular inputs in a particular training data instance (row 1818). Columns 1822 (shown as columns 1822a-1822d) provide information about operations, and also form part of the training data. Column 1822a provides a numerical identifier for an operation, which can allow more specific operation comparisons, while columns 1822b-1822d can be used for more general comparisons, which can allow for a greater pool of training data to be used (for example, because operations that do not have the same operation identifier can be included in a pool of training data). Columns 1822c and 1822d can represent a parsed, standardized version of an operation description in column 1822b. Columns 1822c and 1822d can be generated from the operation description of column 1822b in a similar manner as the input descriptions 1206 of FIG. 12. The table 1810 also includes a column 1826 that lists a particular processing resource that performed the operation of column 1822a. Columns 1830 are standard values labels for the training data instance of row 1818, and which represent values for which a prediction will be provided given inference data that includes values for the columns 1814, 1822, 1826.

Figure 18B:
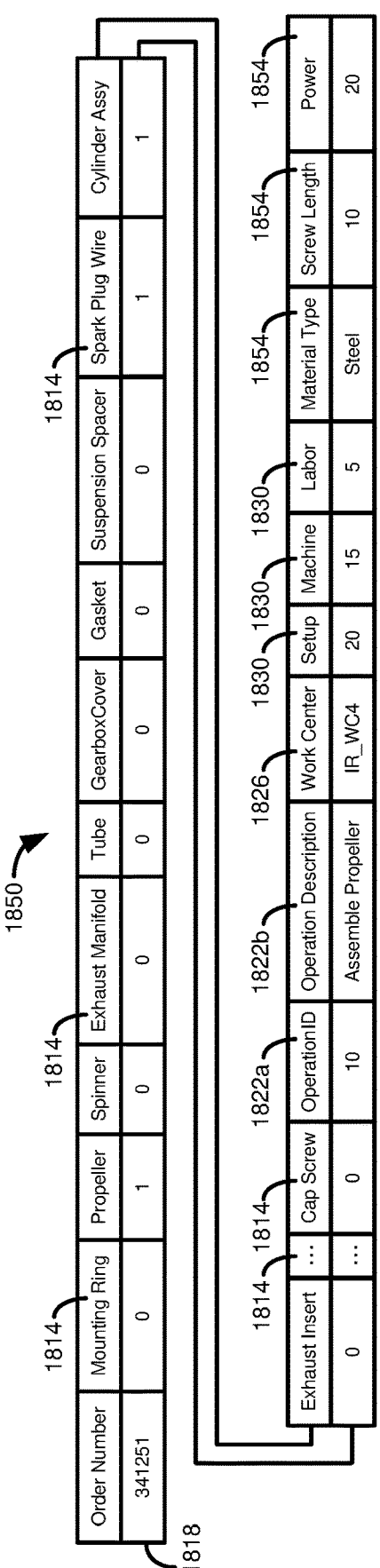
FIG. 18B illustrates how information used in training a model for a standard values prediction, or in obtaining an inference result from such a model, can consider input characteristics.

FIG. 18B illustrates a table 1850 that is generally similar to the table 1810. The table illustrates an example of how input characteristics information can be used in disclosed prediction techniques, specifically in the example of training and use of a machine learning model to estimate standard values. Unlike the table 1810, the table 1850 includes columns 1854 with values for different input characteristics associated with inputs that are used in a particular instance of training or inference data.

Example 12—Example Operations

FIG. 19A provides a flowchart of a method 1900 of creating a flattened representation of a hierarchy that encodes level information for the hierarchy. At 1904, a plurality of elements are received that are arranged in a hierarchy having a plurality of levels. Respective levels of the plurality of levels are associated with respective level values at 1908. The level values differ for respective levels of the hierarchy and increase or decrease from a root of the hierarchy to a lowest level of the hierarchy. A flattened representation of the hierarchy is generated at 1912, including, for elements of the plurality of elements, multiplying a value associated with a respective level by a level value for a level in the hierarchy at which the respective element is located.

FIG. 19B provides a flowchart of a method 1930 of generating a flattened representation of a hierarchy that captures, for individual elements of the hierarchy, relationships with other hierarchy elements. At 1934, a plurality of elements are received that are arranged in a hierarchy having a plurality of levels. Elements of the hierarchy form parent nodes or leaf nodes of the hierarchy. At least one parent node value is defined at 1938, and at least one leaf node value is defined at 1942. At 1946, a flattened representation of the hierarchy is generated including, for elements that are parent nodes, multiplying a value of a respective element by the at least one parent node value and, for elements that are leaf nodes, multiplying a value of a respective element by the at least one leaf node value.

FIG. 19C provides a flowchart of a method 1960 of encoding quantity information for elements of a set. At 1964 a set definition that includes a first plurality of elements is received. A first set comprising a second plurality of elements is received at 1968, where the second plurality of elements is a subset of the first plurality of elements. At 1972, a representation of the first set is generated, including assigning a first value to elements of the first plurality of elements having a corresponding element in the elements of the second plurality of elements, and assigning a second value, different than the first value, to elements of the first plurality of elements that do not have a corresponding element in the elements of the second plurality of elements. At 1976, respective quantity values for elements of the first plurality of elements having a corresponding element in the second plurality of elements are received. At 1980, for elements of the first plurality of elements having a corresponding element in the elements of the second plurality of elements, the respective quantity value is added to the first value.

Example 13—Computing Systems

Figure 20:
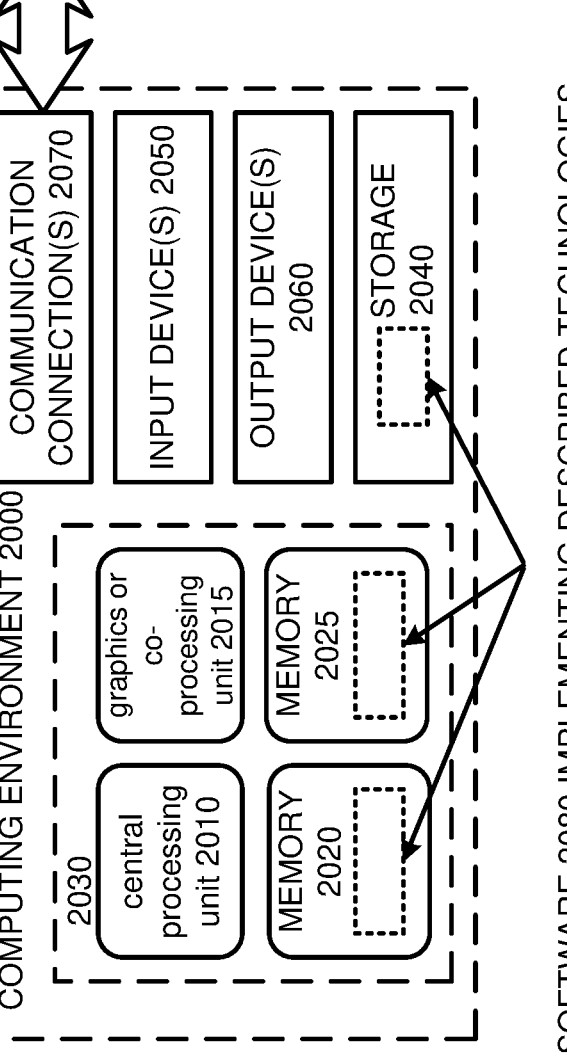
FIG. 20 is a diagram of an example computing system in which some described embodiments can be implemented.

FIG. 20 depicts a generalized example of a suitable computing system 2000 in which the described innovations may be implemented. The computing system 2000 is not intended to suggest any limitation as to scope of use or functionality of the present disclosure, as the innovations may be implemented in diverse general-purpose or special-purpose computing systems.

With reference to FIG. 20, the computing system 2000 includes one or more processing units 2010, 2015 and memory 2020, 2025. In FIG. 20, this basic configuration 2030 is included within a dashed line. The processing units 2010, 2015 execute computer-executable instructions, such as for implementing technologies described in Examples 1-12. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 20 shows a central processing unit 2010 as well as a graphics processing unit or co-processing unit 2015. The tangible memory 2020, 2025 may be volatile memory (e.g., registers, cache, RAM), non-volatile memory (e.g., ROM, EEPROM, flash memory, etc.), or some combination of the two, accessible by the processing unit(s) 2010, 2015. The memory 2020, 2025 stores software 2080 implementing one or more innovations described herein, in the form of computer-executable instructions suitable for execution by the processing unit(s) 2010, 2015. The memory 2020, 2025, may also store database data.

A computing system 2000 may have additional features. For example, the computing system 2000 includes storage 2040, one or more input devices 2050, one or more output devices 2060, and one or more communication connections 2070, including input devices, output devices, and communication connections for interacting with a user. An interconnection mechanism (not shown) such as a bus, controller, or network interconnects the components of the computing system 2000. Typically, operating system software (not shown) provides an operating environment for other software executing in the computing system 2000, and coordinates activities of the components of the computing system 2000.

The tangible storage 2040 may be removable or non-removable, and includes magnetic disks, magnetic tapes or cassettes, CD-ROMs, DVDs, or any other medium which can be used to store information in a non-transitory way, and which can be accessed within the computing system 2000. The storage 2040 stores instructions for the software 2080 implementing one or more innovations described herein.

The input device(s) 2050 may be a touch input device such as a keyboard, mouse, pen, or trackball, a voice input device, a scanning device, or another device that provides input to the computing system 2000. The output device(s) 2060 may be a display, printer, speaker, CD-writer, or another device that provides output from the computing system 2000.

The communication connection(s) 2070 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general-purpose program, such as one or more lines of code in a larger or general-purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 14—Cloud Computing Environment

Figure 21:
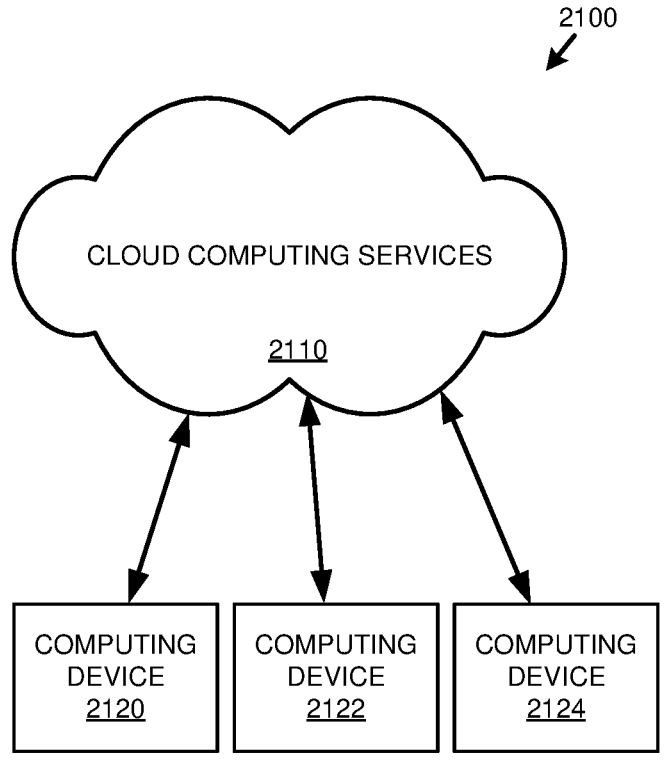
FIG. 21 is an example cloud computing environment that can be used in conjunction with the technologies described herein.

FIG. 21 depicts an example cloud computing environment 2100 in which the described technologies can be implemented. The cloud computing environment 2100 comprises cloud computing services 2110. The cloud computing services 2110 can comprise various types of cloud computing resources, such as computer servers, data storage repositories, networking resources, etc. The cloud computing services 2110 can be centrally located (e.g., provided by a data center of a business or organization) or distributed (e.g., provided by various computing resources located at different locations, such as different data centers and/or located in different cities or countries).

The cloud computing services 2110 are utilized by various types of computing devices (e.g., client computing devices), such as computing devices 2120, 2122, and 2124. For example, the computing devices (e.g., 2120, 2122, and 2124) can be computers (e.g., desktop or laptop computers), mobile devices (e.g., tablet computers or smart phones), or other types of computing devices. For example, the computing devices (e.g., 2120, 2122, and 2124) can utilize the cloud computing services 2110 to perform computing operations (e.g., data processing, data storage, and the like).

Example 15—Implementations

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 20, computer-readable storage media include memory 2020 and 2025, and storage 2040. The term computer-readable storage media does not include signals and carrier waves. In addition, the term computer-readable storage media does not include communication connections (e.g., 2070).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network, or other such network) using one or more network computers.

For clarity, only certain selected aspects of the software-based implementations are described. It should be understood that the disclosed technology is not limited to any specific computer language or program. For instance, the disclosed technology can be implemented by software written in C++, Java, Perl, JavaScript, Python, Ruby, ABAP, SQL, Adobe Flash, or any other suitable programming language, or, in some examples, markup languages such as html or XML, or combinations of suitable programming languages and markup languages. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present, or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
at least one hardware processor;
at least one memory coupled to the at least one hardware processor; and
one or more computer-readable storage media comprising computer-executable instructions that, when executed, cause the computing system to perform operations comprising:

receiving structured data representing a plurality of data elements arranged in a hierarchy having a plurality of levels;

associating respective levels of the hierarchy with a respective level value, where level values differ for the respective levels of the hierarchy and the level values increase or decrease from a root of the hierarchy to a lowest level of the hierarchy;

generating a flattened representation of the hierarchy, the generating the flattened representation comprising, for respective elements of the plurality of elements, multiplying a value associated with a respective element by a level value that encodes a hierarchical depth of the respective element to generate a depth-specific level-weighted numerical value, where the depth-specific level-weighted numerical values preserve hierarchical context in a flattened vector representation provided as input to the machine learning model or inference engine to enable generation of control outputs for routing or resource-assignment decisions;

storing or otherwise preparing the flattened representation for input to a machine learning model or inference engine;

providing the flattened representation as input to a machine learning model or inference engine, the machine learning model being trained, or the inference engine being configured, to generate a control output from the input, the control output being produced by evaluating the level-weighted numerical values of the flattened representation to determine routing or resource-assignment decisions, the control output specifying a configuration of routing or resource-assignment behavior within a computerized-execution environment;

configuring, based on the control output and without requiring user intervention, at least one of: a machine operation, a processing resource assignment, an operation sequence, or an input-to-operation allocation, the configuration represented in at least one configuration data structure maintained within the computerized execution environment; and initiating execution of the configured machine operation, an operation using the configured processing resource assignment, an operation of the configured operation sequence, or an operation using the configured input-to-operation allocation, within the computerized execution environment, the initiating comprising either automated performance by a processing resource or generation of a system-directed work instruction for performance using the configured processing resource.

2. The computing system of claim 1, wherein elements of the plurality of elements are parent nodes, where a parent node has at least one child node at a lower level of the hierarchy than the parent node, or leaf nodes, wherein a leaf node is not a parent node, the operations further comprising:
defining at least one parent node value; and
defining at least one leaf node value;
wherein the generating a flattened representation of the hierarchy comprises, for elements of the plurality of elements that are parent nodes, multiplying a value associated with a respective element of the plurality of elements that are parent nodes by the at least one parent node value and multiplying a value associated with a respective element of the plurality of elements that are leaf nodes by the at least one leaf node value.

3. The computing system of claim 1, wherein the plurality of elements define a first set, the operations further comprising:

receiving a set definition, the set definition comprising a second plurality of elements, wherein the first plurality of elements are a subset of the second plurality of elements;

wherein the generating a flattened representation of the hierarchy comprises:

for elements of the of the first plurality of elements, assigning a first value to elements of the second plurality of elements that have a corresponding element in the elements of the first plurality of elements and assigning a second value, different than the first value, to elements of the second plurality of elements that do not have a corresponding element in the elements of the first plurality of elements;

for elements of the second plurality of elements having a corresponding element in the elements of the first plurality of elements, receiving a respective quantity value; and for elements of the second plurality of elements having a corresponding element in the elements of the first plurality of elements, adding the respective quantity value to the first value.

4. The computing system of claim 3, wherein the first value is one and the second value is zero.

5. The computing system of claim 1, wherein the hierarchy is a first hierarchy, the operations further comprising:

for respective pluralities of second elements arranged in respective second hierarchies, carrying out the receiving, associating, and generating to produce a plurality of flattened hierarchical representations;

associating respective flattened hierarchical representations of the plurality of flattened hierarchical representations with values for a set of labels; and training a machine learning algorithm with the plurality of flattened hierarchical representations and their respective sets of labels to provide a trained machine learning model.

6. The computing system of claim 5, the operations further comprising:

receiving a set of inference data, the set of inference data comprising a third plurality of elements arranged in a third hierarchy;

carrying out the receiving, associating, and generating using the third plurality of elements to generate a flattened representation of the third hierarchy;

submitting the flattened representation of the third hierarchy to the trained machine learning model and;

obtaining an inference result, the inference result comprising values for the set of labels.

7. The computing system of claim 6, wherein the generating provides respective result values for respective elements of the plurality of elements, the operations further comprising:

normalizing a set of values comprising the respective result values for the third plurality of elements.

8. A method, implemented in a computing system comprising at least one hardware processor and at least one memory coupled to the at least one hardware processor, the method comprising:

receiving structured data representing a plurality of data elements arranged in a hierarchy having a plurality of levels, elements of the plurality of elements being parent nodes, where a parent node has at least one child node at a lower level of the hierarchy than a parent node, or leaf nodes, wherein a leaf node is not a parent node;

defining at least one parent node value representing a level in the hierarchy of the parent node;

defining at least one leaf node value representing a level in the hierarchy of the at least one leaf node; and generating a flattened representation of the hierarchy, the generating the flattened representation comprising, for respective elements of the plurality of elements that are parent nodes, multiplying a value associated with a respective element of the plurality of elements that are parent nodes by the at least one parent node value and multiplying a value associated with a respective element of the plurality of elements that are leaf nodes by the at least one leaf node value, wherein the multiplying generates for each respective element a depth-specific level-weighted numerical value that encodes a hierarchical depth of the respective element and preserves hierarchical context in a flattened vector representation provided as input to a machine learning model or inference engine to enable generation of control outputs for routing or resource-assignment decisions;

storing or otherwise preparing the flattened representation for input to a machine learning model or inference engine;

providing the flattened representation as input to a machine learning model or inference engine, the machine learning model being trained, or the inference engine being configured, to generate a control output from the input, the control output being produced by evaluating the level-weighted numerical values of the flattened representation to determine routing or resource-assignment decisions, the control output specifying a configuration of routing or resource-assignment behavior within a computerized-execution environment;

configuring, based on the control output and without requiring user intervention, at least one of: a machine operation, a processing resource assignment, an operation sequence, or an input-to-operation allocation, the configuration represented in at least one configuration data structure maintained within the computerized-execution environment; and initiating execution of the configured machine operation, an operation using the configured processing resource assignment, an operation of the configured operation sequence, or an operation using the configured input-to-operation allocation, within the computerized-execution environment, the initiating comprising either automated performance by a processing resource or generation of a system-directed work instruction for performance using the configured processing resource.

9. The method of claim 8, further comprising:

associating respective levels of the plurality of levels with a respective level value, where level values differ for the levels of the hierarchy and the level values increase or decrease from a root of the hierarchy to a lowest level of the hierarchy;

wherein the generating the flattened representation of the hierarchy comprises, for elements of the plurality of elements, multiplying a value associated with a respective element by a level value for a level in the hierarchy at which the respective element is located.

10. The method of claim 8, further comprising:

receiving a set definition, the set definition comprising a second plurality of elements, wherein the first plurality of elements are a subset of the second plurality of elements;

wherein the generating a flattened representation of the hierarchy comprises:

for elements of the of the first plurality of elements, assigning a first value to elements of the second plurality of elements that have a corresponding element in the elements of the first plurality of elements and assigning a second value, different than the first value, to elements of the second plurality of elements that do not have a corresponding element in the elements of the first plurality of elements;

for elements of the second plurality of elements having a corresponding element in the elements of the first plurality of elements, receiving a respective quantity value; and for elements of the second plurality of elements having a corresponding element in the elements of the first plurality of elements, adding the respective quantity value to the first value.

11. The method of claim 10, wherein the first value is one and the second value is zero.

12. The method of claim 8, wherein the hierarchy is a first hierarchy, the method further comprising:

for respective pluralities of second elements arranged in respective second hierarchies, carrying out the receiving and the generating to produce a plurality of flattened hierarchical representations;

associating respective flattened hierarchical representations of the plurality of flattened hierarchical representations with values for a set of labels; and training a machine learning algorithm with the plurality of flattened hierarchical representations and their respective sets of labels to provide a trained machine learning model.

13. The method of claim 12, further comprising:

receiving a set of inference data, the set of inference data comprising a third plurality of elements arranged in a third hierarchy;

carrying out the receiving and the generating using the third plurality of elements to generate a flattened representation of the third hierarchy;

submitting the flattened representation of the third hierarchy to the trained machine learning model and;

obtaining an inference result, the inference result comprising values for the set of labels.

14. The method of claim 13, wherein the generating provides respective result values for respective elements of the plurality of elements, the method further comprising:

normalizing a set of values comprising the respective result values for the third plurality of elements.

15. One or more computer-readable storage media comprising:

computer-executable instructions that, when executed by a computing system comprising at least one hardware processor and at least one memory coupled to the at least one hardware processor, cause the computing system to receive a set definition, the set definition comprising a first plurality of elements;

computer-executable instructions that, when executed by the computing system, cause the computing system to receive a first set comprising a second plurality of elements, the second plurality of elements being a subset of the first plurality of elements;

computer-executable instructions that, when executed by the computing system, cause the computing system to generate a representation of the first set, the generating a representation comprising, for elements of the of the first plurality of elements, assigning a first value to elements of the first plurality of elements that have a corresponding element in the elements of the second plurality of elements and assigning a second value, different than the first value, to elements of the first plurality of elements that do not have a corresponding element in the elements of the second plurality of elements;

computer-executable instructions that, when executed by the computing system, cause the computing system to, for elements of the first plurality of elements having a corresponding element in the elements of the second plurality of elements, receive a respective quantity value;

computer-executable instructions that, when executed by the computing system, cause the computing system to, for elements of the first plurality of elements having a corresponding element in the elements of the second plurality of elements, add the respective quantity value to the first value to generate a modified representation;

computer-executable instructions that, when executed by the computing system, cause the computing system to store or otherwise prepare the modified representation for input to a machine learning model or inference engine;

computer-executable instructions that, when executed by the computing system, cause the computing system to provide the modified representation as input to a machine learning model or inference engine, the machine learning model being trained, or the inference engine being configured, to generate a control output from the input, the control output specifying a configuration of routing or resource-assignment behavior within a computerized execution environment;

computer-executable instructions that, when executed by the computing system, cause the computing system to configure, based on the control output and without requiring user intervention, at least one of: a machine operation, a processing resource assignment, an operation sequence, or an input-to-operation allocation, the configuration controlling execution behavior within a computerized execution environment; and the computing system to initiate execution of the configured machine operation, an operation using the configured processing resource assignment, an operation of the configured operation sequence, or an operation using the configured input-to-operation allocation, within the computerized execution environment, the initiating comprising either automated performance by a processing resource or generation of a system-directed work instruction for performance using the configured processing resource.

16. The one or more computer-readable storage media of claim 15, wherein the computer-executable instructions that add the respective quantity value to the first value produce a first encoded representation of the first set, the one or more computer-readable storage media further comprising:

computer-executable instructions that, when executed by the computing system, cause the computing system to generate encoded representations of a plurality of additional sets by adding quantity values of elements of the plurality of additional sets to the first value;

computer-executable instructions that, when executed by the computing system, cause the computing system to associate respective encoded representations of the first set and the plurality of additional sets with values for a set of labels; and computer-executable instructions that, when executed by the computing system, cause the computing system to train a machine learning algorithm with the encoded representations of the first set and the plurality of additional sets and their respective sets of labels to provide a trained machine learning model.

17. The one or more computer-readable storage media of claim 16, further comprising:

computer-executable instructions that, when executed by the computing system, cause the computing system to receive a set of inference data, the set of inference data comprising a third plurality of elements;

computer-executable instructions that, when executed by the computing system, cause the computing system to generate an encoded representation of the set of inference data by adding quantity values of elements of the third plurality of elements to the first value;

computer-executable instructions that, when executed by the computing system, cause the computing system to submit the encoded representation of the third plurality of elements to the trained machine learning model and;

computer-executable instructions that, when executed by the computing system, cause the computing system to obtain an inference result, the inference result comprising values for the set of labels.

18. The one or more computer-readable storage media of claim 15, wherein elements of the second plurality of elements are further organized in a hierarchy and are parent nodes, where a parent node has at least one child node at a lower level of the hierarchy than a parent node, or leaf nodes, wherein a leaf node is not a parent node, the one or more computer-readable storage media further comprising:

computer-executable instructions that, when executed by the computing system, cause the computing system to define at least one parent node value; and computer-executable instructions that, when executed by the computing system, cause the computing system to define at least one leaf node value;

computer-executable instructions that, when executed by the computing system, cause the computing system to generate a flattened representation of the hierarchy by, for elements of the second plurality of elements that are parent nodes, computer-executable instructions that, when executed by the computing system, cause the computing system to multiply a value associated with a respective element of the plurality of elements that are parent nodes by the at least one parent node value and computer-executable instructions that, when executed by the computing system, cause the computing system to multiply a value associated with a respective element of the plurality of elements that are leaf nodes by the at least one leaf node value.

19. The one or more computer-readable storage media of claim 15, wherein elements of the second plurality of elements are further organized in a hierarchy having a plurality of levels, further comprising:

computer-executable instructions that, when executed by the computing system, cause the computing system to associate respective levels of the plurality levels with a respective level value, where level values differ for the respective levels of the hierarchy and the levels values increase or decrease from a root of the hierarchy to a lowest level of the hierarchy;

computer-executable instructions that, when executed by the computing system, cause the computing system to generate a flattened representation of the hierarchy by, for elements of the second plurality of elements, multiply a value associated with a respective element by a level value for a level in the hierarchy at which the respective element is located.

20. The one or more computer-readable storage media of claim 15, wherein the first value is one and the second value is zero.

* * * * *